US012621624B2

(12) United States Patent
Katayama et al.

(10) Patent No.: US 12,621,624 B2
(45) Date of Patent: May 5, 2026

(54) AUDIO MIXING DEVICE AND ELECTRONIC DEVICE

(71) Applicant: SEIKO EPSON CORPORATION, Tokyo (JP)

(72) Inventors: Takao Katayama, Matsumoto (JP); Fumihito Baisho, Kai (JP); Tsutomu Nonaka, Hino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 193 days.

(21) Appl. No.: 18/506,663

(22) Filed: Nov. 10, 2023

(65) Prior Publication Data

US 2024/0163625 A1 May 16, 2024

(30) Foreign Application Priority Data

Nov. 14, 2022 (JP) ................................. 2022-181649

(51) Int. Cl.
| | |
|---|---|
| *H04R 5/00* | (2006.01) |
| *H04B 17/309* | (2015.01) |
| *H04S 7/00* | (2006.01) |
| *H04B 1/00* | (2006.01) |

(52) U.S. Cl.
CPC ............. *H04S 7/30* (2013.01); *H04B 17/309* (2015.01)

(58) Field of Classification Search
CPC ................................ H04S 7/30; H04B 17/309
USPC ....................................................... 381/1, 119
See application file for complete search history.

(56) References Cited

U.S. PATENT DOCUMENTS

| | | | |
|---|---|---|---|
| 8,275,307 B2 * | 9/2012 | Doyle, III ................ | H04R 5/04 |
| | | | 455/3.06 |
| 2013/0031287 A1 | 1/2013 | Miyake | |
| 2015/0363155 A1 * | 12/2015 | Hayashi ................... | G06F 3/16 |
| | | | 700/94 |

FOREIGN PATENT DOCUMENTS

| | | |
|---|---|---|
| JP | 2013-29977 A | 2/2013 |
| JP | 2014-137790 A | 7/2014 |

* cited by examiner

*Primary Examiner* — Ammar T Hamid
(74) *Attorney, Agent, or Firm* — Rankin, Hill & Clark LLP

(57) ABSTRACT

An audio mixing device includes: a mixing circuit configured to mix a plurality of pieces of audio data to be played included in first to p-th audio data among first to n-th audio data when the plurality of pieces of audio data are input in a same period, and output a mixing signal, n being an integer of three or more and p being an integer equal to or larger than two and less than n; and an arbitration circuit configured to arbitrate input of (p+1)-th to n-th audio data among the first to n-th audio data to the mixing circuit.

20 Claims, 16 Drawing Sheets

*FIG. 1*

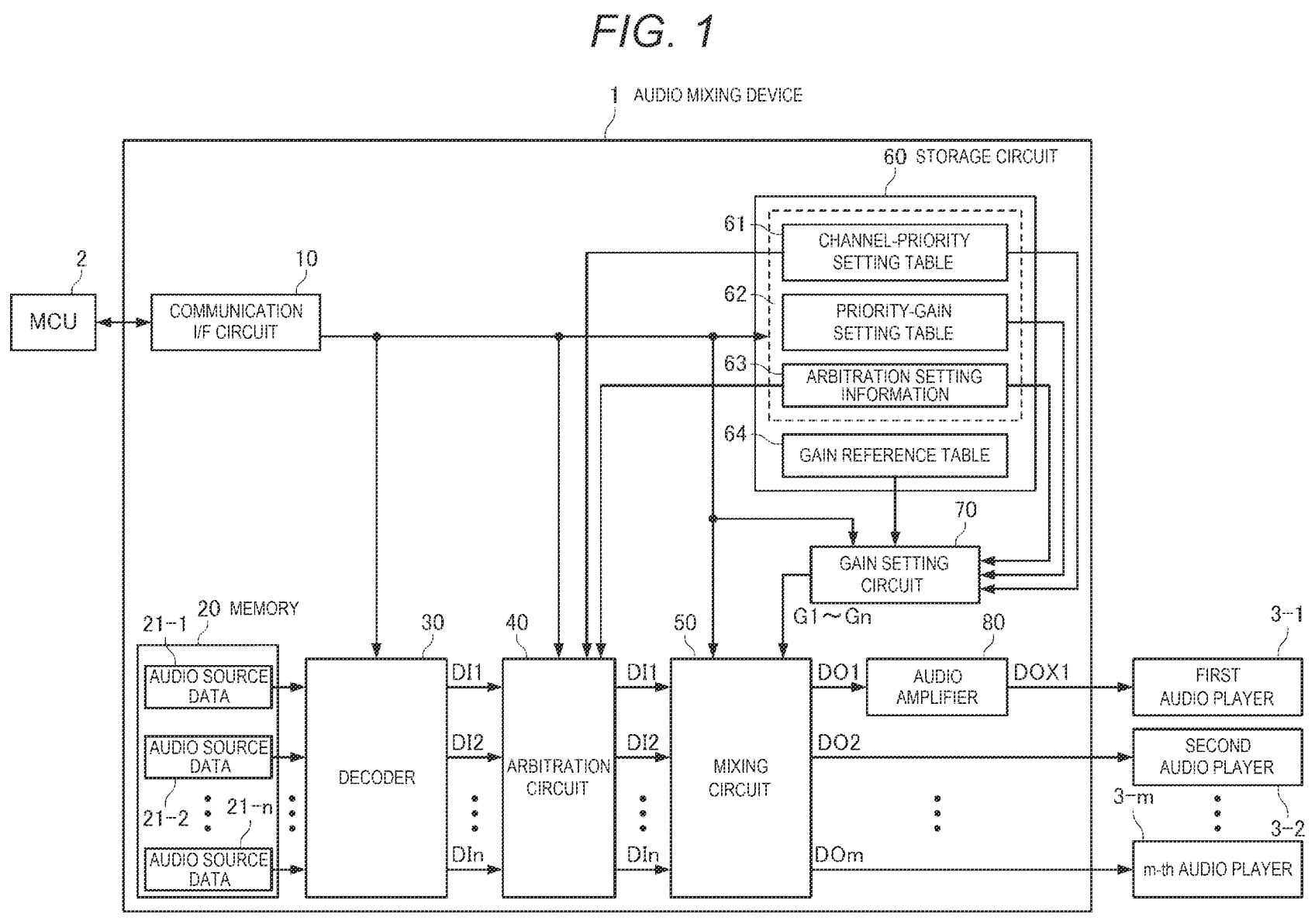

1 AUDIO MIXING DEVICE

2 MCU

10 COMMUNICATION I/F CIRCUIT

60 STORAGE CIRCUIT

61 CHANNEL-PRIORITY SETTING TABLE

62 PRIORITY-GAIN SETTING TABLE

63 ARBITRATION SETTING INFORMATION

64 GAIN REFERENCE TABLE

70 GAIN SETTING CIRCUIT

80 AUDIO AMPLIFIER

DOX1

$G1\sim Gn$

50 MIXING CIRCUIT

DO1  DO2  DOm

DI1  DI2  DIn

40 ARBITRATION CIRCUIT

DI1  DI2  DIn

30 DECODER

20 MEMORY 21-1  21-2  21-n

AUDIO SOURCE DATA  AUDIO SOURCE DATA  AUDIO SOURCE DATA 3-1 FIRST AUDIO PLAYER 3-2 SECOND AUDIO PLAYER 3-m  m-th AUDIO PLAYER

| CHANNEL | PRIORITY |
|---------|----------|
| Ch1 | Pr7 |
| Ch2 | Pr5 |
| Ch3 | Pr9 |
| Ch4 | Pr12 |
| Ch5 | Pr6 |
| Ch6 | Pr2 |
| Ch7 | Pr10 |
| Ch8 | Pr11 |
| Ch9 | Pr1 |
| Ch10 | Pr3 |
| Ch11 | Pr8 |
| Ch12 | Pr4 |
| Ch13 | Pr16 |
| Ch14 | Pr15 |
| Ch15 | Pr14 |
| Ch16 | Pr13 |

62

| PRIORITY | GAIN SETTING VALUE |
|----------|--------------------|
| Pr1(High) | 0x00 |
| Pr2 | 0x0C |
| Pr3 | 0x18 |
| Pr4 | 0x24 |
| Pr5 | 0x30 |
| Pr6 | 0x3C |
| Pr7 | 0x48 |
| Pr8 | 0x54 |
| Pr9 | 0x60 |
| Pr10 | 0x6C |
| Pr11 | 0x78 |
| Pr12 | 0x84 |
| Pr13 | 0x90 |
| Pr14 | 0x9C |
| Pr15 | 0xA8 |
| Pr16(Low) | 0xB4 |

64

| GAIN SETTING VALUE | GAIN VALUE |
|--------------------|-----------|
| 0x00 | 0dB |
| 0x01 | −0.25dB |
| 0x02 | −0.5dB |
| ⋮ | ⋮ |
| 0x0C | −3dB |
| ⋮ | ⋮ |
| 0x18 | −6dB |
| ⋮ | ⋮ |
| 0x24 | −9dB |
| ⋮ | ⋮ |
| 0x30 | −12dB |
| ⋮ | ⋮ |
| 0x3C | −15dB |
| ⋮ | ⋮ |
| 0x48 | −18dB |
| ⋮ | ⋮ |
| 0x54 | −21dB |
| ⋮ | ⋮ |
| 0x60 | −24dB |
| ⋮ | ⋮ |
| 0x6C | −27dB |
| ⋮ | ⋮ |
| 0x78 | −30dB |
| ⋮ | ⋮ |
| 0x84 | −33dB |
| ⋮ | ⋮ |
| 0x90 | −36dB |
| ⋮ | ⋮ |
| 0x9C | −39dB |
| ⋮ | ⋮ |
| 0xA8 | −42dB |
| ⋮ | ⋮ |
| 0xB4 | −45dB |
| ⋮ | ⋮ |
| 0xFD | −63.25dB |
| 0xFE | −63.5dB |
| 0xFF | nosound |

| CHANNEL | PRIORITY |
|---------|----------|
| Ch2 | Pr1 |
| Ch3 | Pr2 |
| Ch4 | Pr3 |
| Ch5 | Pr4 |

*FIG. 17*

AUDIO MIXING DEVICE AND ELECTRONIC DEVICE

The present application is based on, and claims priority from JP Application Serial Number 2022-181649, filed Nov. 14, 2022, the disclosure of which is hereby incorporated by reference herein in its entirety.

BACKGROUND

1. Technical Field

The present disclosure relates to an audio mixing device and an electronic device.

2. Related Art

JP-A-2014-137790 discloses an audio output control device that acquires end time information related to an estimated time at which transmission of a meaningful content of earlier audio information is completed, acquires delay permissible information related to a permissible time of delay from a time when a request for outputting later audio information is made until the output of the later audio information starts, determines whether standby for outputting the later audio information is allowed according to a temporal relation between the end time information and the delay permissible information, stands by for outputting the later audio information under a condition that it is determined that standby is allowed, and outputs the later audio information after preferentially executing the output of the earlier audio information.

In the device described in JP-A-2014-137790, there is a concern that output of either the earlier audio information or the later audio information may be delayed even when both are important information that requires urgency, which may delay a necessary treatment by a user with respect to the audio information whose output is delayed.

SUMMARY

An aspect of an audio mixing device according to the present disclosure includes: a mixing circuit configured to mix a plurality of pieces of audio data to be played included in first to p-th audio data among first to n-th audio data when the plurality of pieces of audio data are input in a same period, and output a mixing signal, n being an integer of three or more and p being an integer equal to or larger than two and less than n; and an arbitration circuit configured to arbitrate input of (p+1)-th to n-th audio data among the first to n-th audio data to the mixing circuit.

An aspect of an electronic device according to the present disclosure includes the aspect of the audio mixing device.

BRIEF DESCRIPTION OF THE DRAWINGS

FIG. 1 is a diagram showing a configuration example of an audio mixing device according to a first embodiment.

FIG. 3 is a diagram showing an example of a channel-priority setting table, a priority-gain setting table, arbitration setting information, and a gain reference table.

FIG. 11 is a diagram showing an example of a priority selection table.

FIG. 17 is a diagram showing a configuration example of a warning device which is an example of the electronic device.

DESCRIPTION OF EMBODIMENTS

Figure 2:
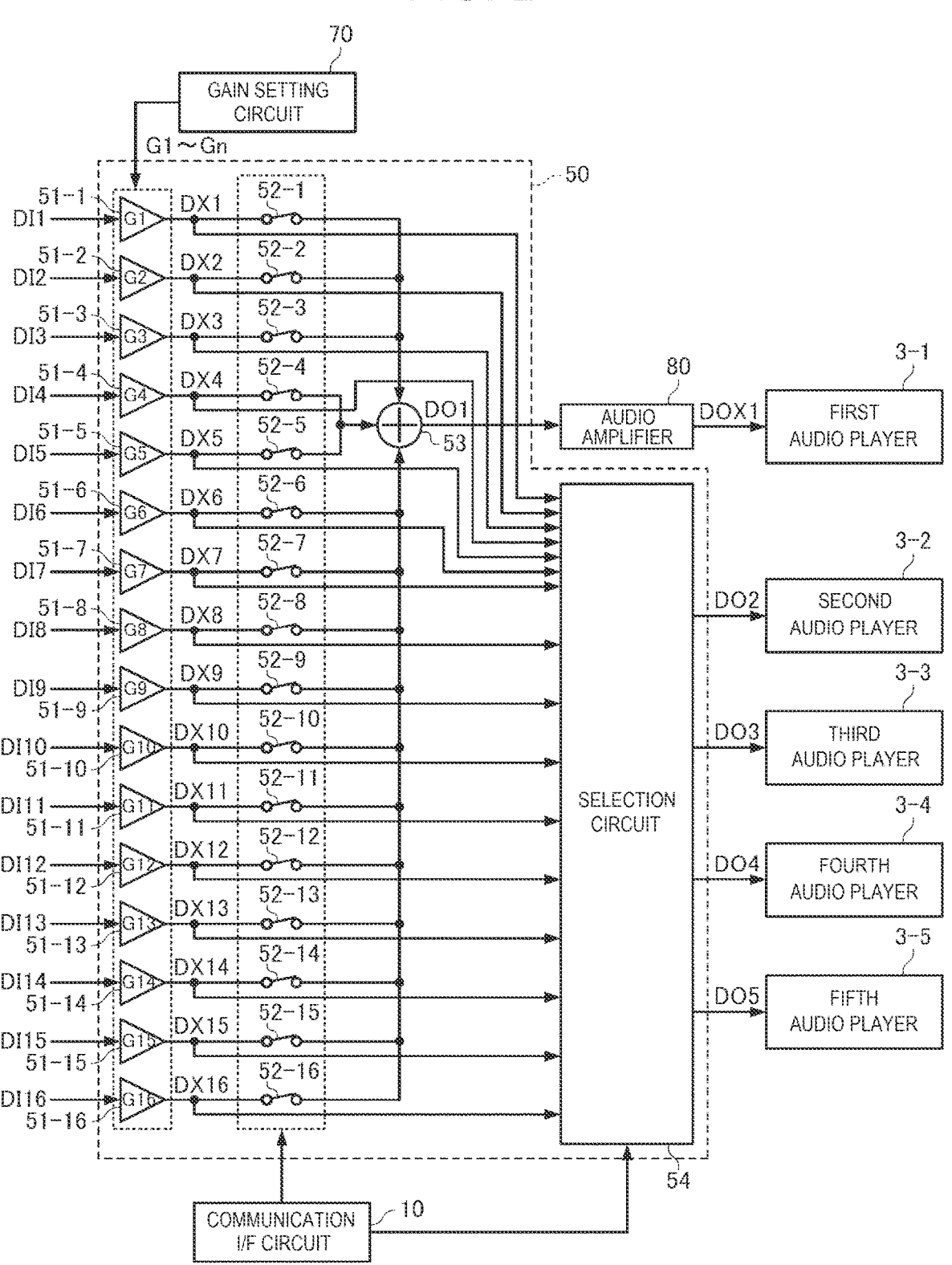
FIG. 2 is a diagram showing a specific configuration example of a mixing circuit.

Hereinafter, preferred embodiments of the present disclosure will be described in detail with reference to the drawings. The embodiments to be described below do not unduly limit contents of the present disclosure described in the claims. Not all configurations to be described below are necessarily essential constituent elements of the present disclosure.

1. Audio Mixing Device

1-1. First Embodiment

FIG. 1 is a diagram showing a configuration example of an audio mixing device according to a first embodiment. As shown in FIG. 1, an audio mixing device 1 according to the first embodiment includes a communication interface circuit 10, a memory 20, a decoder 30, an arbitration circuit 40, a mixing circuit 50, a storage circuit 60, a gain setting circuit 70, and an audio amplifier 80. The audio mixing device 1 may be a single-chip semiconductor integrated circuit device, or a multi-chip semiconductor integrated circuit device, or at least a part of the audio mixing device 1 may be implemented by an electronic component other than the semiconductor integrated circuit device.

The memory 20 stores n pieces of audio source data 21-1 to 21-n. That is, the n pieces of audio source data 21-1 to 21-n are stored in the memory 20. Here, n is an integer of three or more. The audio source data 21-1 to 21-n stored in the memory 20 are data that serve as a base of first to n-th audio data input to the mixing circuit 50 to be described later. The memory 20 may be, for example, a flash memory. The audio source data 21-1 to 21-$n$ may be, for example, PCM audio data, or may be ADPCM audio data. PCM is an abbreviation of pulse code modulation, and ADPCM is an abbreviation of adaptive differential pulse code modulation. The audio source data 21-1 to 21-$n$ may be, for example, data that serve as a base of various kinds of sounds such as a sound imitating a voice when a person speaks, a mechanical warning sound, a sound effect, or the like.

In the embodiment, p pieces of audio source data among the n pieces of audio source data 21-1 to 21-$n$ are audio source data played in a state of relatively high urgency, and n–p pieces of audio source data among the n pieces of audio source data 21-1 to 21-$n$ are audio source data played in a state of relatively low urgency. p is an integer equal to or larger than two and less than n. Hereinafter, the former audio source data is referred to as "audio source data having high urgency", and the latter audio source data is referred to as "audio source data having low urgency".

For example, when the audio mixing device 1 is used in a system mounted on an automated vehicle, audio source data of a warning sound for notifying a component failure of the automated vehicle, abnormal traveling, or the like is assumed as the audio source data having high urgency, and audio source data of various kinds of guidance is assumed as the audio source data having low urgency.

The communication interface circuit 10 is a circuit that performs data communication with a micro-control unit 2. The communication interface circuit 10 may be, for example, an SPI interface circuit or an I2C interface circuit. SPI is an abbreviation of serial peripheral interface, and I2C is an abbreviation of inter-integrated circuit.

The communication interface circuit 10 receives various commands transmitted from the micro-control unit 2, and generates various control signals corresponding to the received commands. For example, when the communication interface circuit 10 receives an audio play command or an audio stop command for the audio source data 21-$i$ of the n pieces of audio source data 21-1 to 21-$n$ stored in the memory 20, the communication interface circuit 10 generates a control signal for instructing audio play or audio stop for the audio source data 21-$i$, and outputs the control signal to the decoder 30, the arbitration circuit 40, and the gain setting circuit 70. Further, for example, when the communication interface circuit 10 receives a data write command for a channel-priority setting table 61, a priority-gain setting table 62, or arbitration setting information 63, the communication interface circuit 10 generates a control signal for writing data designated by an address designated by the command.

The decoder 30 includes first to n-th input channels and first to n-th output channels. The decoder 30 reads the audio source data 21-$i$ from the memory 20 to the i-th input channel in response to a control signal for instructing audio play for the audio source data 21-$i$ output from the communication interface circuit 10, decodes the audio source data 21-$i$, and demodulates audio data DIi. The decoder 30 outputs the demodulated audio data DIi to the i-th output channel. The decoder 30 stops the output of the audio data DIi to the i-th output channel in response to a control signal for instructing play stop for the audio source data 21-$i$ output from the communication interface circuit 10. The decoder 30 may stop the output of the audio data DIi to the i-th output channel when the demodulation is completed up to an end of the audio source data 21-$i$.

When the audio source data 21-$i$ is audio source data having high urgency, the demodulated audio data DIi is audio data having high urgency, and when the audio source data 21-$i$ is audio source data having low urgency, the demodulated audio data DIi is audio data having low urgency. That is, among n pieces of audio data DI1 to DIn output to the first to n-th output channels of the decoder 30, p pieces of the audio data are audio data having high urgency, and n–p pieces of the audio data are audio data having low urgency.

The arbitration circuit 40 outputs the audio data DIi demodulated by the decoder 30 to the i-th input channel of the mixing circuit 50 in response to a control signal for instructing audio play for the audio source data 21-$i$ output from the communication interface circuit 10. When the audio data DIi to be played is audio data having high urgency, the arbitration circuit 40 immediately outputs the audio data DIi to the i-th input channel of the mixing circuit 50.

When the audio data DIi to be played is audio data having low urgency, if at least one of the p pieces of audio data having high urgency is being played, the arbitration circuit 40 waits until none of the p pieces of audio data is being played, and then outputs the audio data DIi to the i-th input channel of the mixing circuit 50. On the other hand, if none of the p pieces of audio data having high urgency is being played, the arbitration circuit 40 immediately outputs the audio data DIi to the i-th input channel of the mixing circuit 50.

When the audio data DIi to be played is audio data having low urgency, if the audio data DIj other than the audio data DIi among the n–p pieces of audio data having low urgency is being played, the arbitration circuit 40 waits until play of the audio data DIj is ended, and then outputs the audio data DIi to the i-th input channel of the mixing circuit 50.

The arbitration circuit 40 stops the output of the audio data DIi to the i-th input channel of the mixing circuit 50 in response to a control signal for instructing play stop for the audio source data 21-$i$. The arbitration circuit 40 may stop the output of the audio data DIi to the i-th input channel of the mixing circuit 50 when input up to an end of the audio data DIi from the decoder 30 is ended.

In the embodiment, the arbitration circuit 40 determines whether the audio data DIi to be played is audio data having high urgency or audio data having low urgency based on the channel-priority setting table 61 and the arbitration setting information 63 stored in the storage circuit 60. The channel-priority setting table 61 is a table that defines a correspondence relation between the first to n-th input channels of the mixing circuit 50 and priorities thereof. The arbitration setting information 63 includes information of an input channel having p-th or (p+1)-th priority among the first to n-th input channels of the mixing circuit 50. The channel-priority setting table 61 and the arbitration setting information 63 are stored in a RAM or a register (not shown) of the storage circuit 60, and are rewritten by a command input from the outside of the audio mixing device 1. RAM is an abbreviation of random access memory.

The arbitration circuit 40 refers to the channel-priority setting table 61 and specifies a priority of the i-th input channel of the mixing circuit 50 from which the audio data DIi to be played is to be output. Furthermore, the arbitration circuit 40 refers to the arbitration setting information 63, and specifies whether the specified priority of the i-th input channel is included in first to p-th ranges or included in (p+1)-th to n-th ranges. The arbitration circuit 40 determines that the audio data DIi is audio data having high urgency when the specified priority of the i-th input channel is included in the first to p-th ranges, and determines that the audio data DIi is audio data having low urgency when the specified priority of the i-th input channel is included in the (p+1)-th to n-th ranges. That is, in the embodiment, the first to p-th audio data that are p pieces of audio data having high urgency among the n pieces of audio data DI1 to DIn are respectively input to the p input channels having the first to p-th priorities among the first to n-th input channels of the mixing circuit 50. The (p+1)-th to n-th audio data that are (n−p) pieces of audio data having low urgency among the n pieces of audio data DIi to DIn are respectively input to the (n−p) input channels having the (p+1)-th to n-th priorities among the first to n-th input channels of the mixing circuit 50.

As described above, in the embodiment, the channel-priority setting table 61 and the arbitration setting information 63 are information for specifying whether the audio data DIi to be played is included in the first to p-th audio data having high urgency or included in the (p+1)-th to n-th audio data having low urgency. As described above, the arbitration circuit 40 arbitrates input of the (p+1)-th to n-th audio data having low urgency to the mixing circuit 50. Specifically, in a case where the j-th audio data included in the first to p-th audio data having high urgency is being played, when the arbitration circuit 40 receives a command for starting play of the k-th audio data included in the (p+1)-th to n-th audio data having low urgency, the arbitration circuit 40 delays input of the k-th audio data to the mixing circuit 50 until the play of the j-th audio data is ended.

The mixing circuit 50 has first to n-th input channels, a gain Gi is set to the i-th input channel, and the audio data DIi is input to the i-th input channel. When a plurality of pieces of audio data to be played included in the first to p-th audio data having high urgency among the n pieces of audio data DI1 to DIn are input in the same period, the mixing circuit 50 mixes the plurality of pieces of audio data and outputs a mixing signal DO1. The mixing circuit 50 includes first to m-th output channels, and outputs the mixing signal DO1 from the first output channel to the audio amplifier 80. Here, m is an integer of two or more.

The audio amplifier 80 converts the mixing signal DO1 output from the mixing circuit 50 into an audio signal DOX1 and outputs the audio signal DOX1 to a first audio player 3-1. Accordingly, audio corresponding to the audio signal DOX1 is output from the first audio player 3-1. For example, the first audio player 3-1 may be a speaker.

As audio signals DO2 to DOm, the mixing circuit 50 may output m−1 pieces of audio data selected from the n pieces of audio data DI1 to DIn from the second to m-th output channels to second to m-th audio players 3-2 to 3-m. Accordingly, audio corresponding to the audio signals DO2 to DOm is output from the second to m-th audio players 3-2 to 3-m. For example, each of the second to m-th audio players 3-2 to 3-m may be a buzzer.

The audio output from the first to m-th audio players 3-1 to 3-m may be, for example, a sound imitating a voice when a person speaks, or may be various kinds of sounds such as a mechanical warning sound, a sound effect, and the like.

The gain setting circuit 70 sets first to p-th gains for the respective first to p-th audio data having high urgency among the n pieces of audio data DI1 to DIn input to the mixing circuit 50 based on a command input from the outside of the audio mixing device 1. The gain setting circuit 70 may further set (p+1)-th to n-th gains for the respective (p+1)-th to n-th audio data having low urgency among the audio data DI1 to DIn. In the embodiment, the gain setting circuit 70 sets the first to n-th gains G1 to Gn in the respective first to n-th input channels of the mixing circuit 50 based on commands input from the outside of the audio mixing device 1. That is, among the n gains G1 to Gn, p gains are the first to p-th gains set for the first to p-th audio data having high urgency and n−p gains are the (p+1)-th to n-th gains set or the (p+1)-th to n-th audio data having low urgency.

Specifically, when the gain setting circuit 70 receives a control signal for instructing audio play or audio stop for the audio source data 21-k output from the communication interface circuit 10, the gain setting circuit 70 refers to the channel-priority setting table 61, the priority-gain setting table 62, the arbitration setting information 63, and the gain reference table 64 that are stored in the storage circuit 60, determines priorities of the k-th audio data DIk and all pieces of audio data that are being play among the audio data DI1 to DIn, and sets gains having values corresponding to the priorities for respective channels.

The priority-gain setting table 62 is a table that defines a correspondence relation between gain setting values and the priorities that can be designated in the channel-priority setting table 61. The gain reference table 64 is a table that defines a correspondence relation between gain values and the gain setting values that can be designated in the priority-gain setting table 62. The priority-gain setting table 62 is stored in a RAM or a register (not shown) of the storage circuit 60, and is rewritten by a command input from the outside of the audio mixing device 1. The gain reference table 64 is stored in a ROM (not shown) of the storage circuit 60 and is not rewritten. ROM is an abbreviation of read only memory.

When the audio data DIi of the audio data DI1 to DIn is not to be played, the gain setting circuit 70 may set the gain Gi to 0, or the decoder 30 may output 0 to the i-th output channel.

In the embodiment, during play of the j-th audio data of the first to p-th audio data having high urgency with a first value being set to the j-th gain of the gains G1 to Gn, the gain setting circuit 70 sets the j-th gain to a second value when the gain setting circuit 70 receives a command for starting or stopping play of audio data having a higher priority than the j-th audio data of the first to p-th audio data from the outside of the audio mixing device 1. Here, when the gain setting circuit 70 receives a command for starting play of audio data having a high priority, the second value is smaller than the first value, and when the gain setting circuit 70 receives a command for stopping play of audio data having a high priority, the second value is larger than the first value.

FIG. 2 is a diagram illustrating a specific configuration example of the mixing circuit 50. In the example of FIG. 2, the mixing circuit 50 includes 16 input channels and five output channels. That is, FIG. 2 shows an example in which the integer n in FIG. 1 is 16 and the integer m is five.

In the example of FIG. 2, the mixing circuit 50 includes 16 multipliers 51-1 to 51-16, 16 switch circuits 52-1 to 52-16, an adder 53, and a selection circuit 54.

The audio data DIi of the audio data DI1 to DIn is input to the i-th input channel of the first to 16th input channels, and the gain Gi is set by the gain setting circuit 70. The i-th input channel is provided with the multiplier 51-i of the multipliers 51-1 to 51-16, and the multiplier 51-i outputs multiplication data DXi obtained by multiplying the audio data DIi by the gain Gi.

The switch circuit 52-i of the switch circuits 52-1 to 52-16 switches whether to output the multiplication data DXi to the adder 53. The switch circuits 52-1 to 52-16 are switched according to control signals output from the communication interface circuit 10. That is, the micro-control unit 2 can set whether to output multiplication data DX1 to DX16 to the adder 53 by outputting predetermined commands to the audio mixing device 1.

The multiplication data DX1 to DX16 are input to the adder 53 via the switch circuits 52-1 to 52-16. That is, for each integer i of 1 or more and 16 or less, when the switch circuit 52-i is in a conductive state, the multiplication data DXi is input to the adder 53, and when the switch circuit 52-i is in a non-conductive state, the multiplication data DXi is not input to the adder 53. The adder 53 outputs the mixing signal DO1 obtained by adding all pieces of input multiplication data among the multiplication data DX1 to DX16.

The mixing signal DO1 output from the adder 53 is output from the first output channel to the audio amplifier 80, and the audio amplifier 80 converts the mixing signal DO1 into an audio signal DOX1 and outputs the audio signal DOX1 to the first audio player 3-1. Accordingly, audio corresponding to the audio signal DOX1 is output from the first audio player 3-1.

The selection circuit 54 selects any one of the multiplication data DX1 to DX16 and outputs the selected multiplication data as an audio signal DO2 from the second output channel to the second audio player 3-2, or outputs a silent audio signal DO2 to the second audio player 3-2 without selecting any one of the multiplication data DX1 to DX16. In the former case, audio corresponding to the audio signal DO2 is output from the second audio player 3-2.

The selection circuit 54 selects any one of the multiplication data DX1 to DX16 and outputs the selected multiplication data as an audio signal DO3 from the third output channel to the third audio player 3-3, or outputs a silent audio signal DO3 to the third audio player 3-3 without selecting any one of the multiplication data DX1 to DX16. In the former case, audio corresponding to the audio signal DO3 is output from the third audio player 3-3.

The selection circuit 54 selects any one of the multiplication data DX1 to DX16 and outputs the selected multiplication data as an audio signal DO4 from the fourth output channel to the fourth audio player 3-4, or outputs a silent audio signal DO4 to the fourth audio player 3-4 without selecting any one of the multiplication data DX1 to DX16. In the former case, audio corresponding to the audio signal DO4 is output from the fourth audio player 3-4.

The selection circuit 54 selects any one of the multiplication data DX1 to DX16 and outputs the selected multiplication data as an audio signal DO5 from the fifth output channel to the fifth audio player 3-5, or outputs a silent audio signal DO5 to the fifth audio player 3-5 without selecting any one of the multiplication data DX1 to DX16. In the former case, audio corresponding to the audio signal DO5 is output from the fifth audio player 3-5.

The selection circuit 54 selects whether to output the multiplication data DX1 to DX16 as the audio signals DO2 to DO5 according to control signals output from the communication interface circuit 10. That is, the micro-control unit 2 can set whether to output the multiplication data DX1 to DX16 as the respective audio signals DO2 to DO5 by outputting predetermined commands to the audio mixing device 1.

FIG. 3 is a diagram showing an example of the channel-priority setting table 61, the priority-gain setting table 62, the arbitration setting information 63, and the gain reference table 64 when the mixing circuit 50 has a configuration as shown in FIG. 2. In FIG. 3, Ch1 to Ch16 are the first to 16th input channels of the mixing circuit 50, respectively.

In the example of FIG. 3, in the channel-priority setting table 61, a priority Pr7 is associated with the first input channel, a priority Pry is associated with the second input channel, a priority Pr9 is associated with the third input channel, a priority Pr12 is associated with the fourth input channel, a priority Pr6 is associated with the fifth input channel, and a priority Pr2 is associated with the sixth input channel. A priority Pr10 is associated with the seventh input channel, a priority Pr11 is associated with the eighth input channel, a priority Pr1 is associated with the ninth input channel, a priority Pr3 is associated with the tenth input channel, a priority Pr8 is associated with the eleventh input channel, and a priority Pr4 is associated with the 12th input channel. A priority Pr16 is associated with the 13th input channel, a priority Pr15 is associated with the 14th input channel, a priority Pr14 is associated with the 15th input channel, and a priority Pr13 is associated with the 16th input channel. Among the priorities Pr1 to Pr16, Pri represents an i-th highest priority. That is, since the priority Pr1 is the highest and the priority Pr16 is the lowest, priorities are assigned to the ninth input channel, the sixth input channel, the tenth input channel, the 12th input channel, the second input channel, the fifth input channel, the first input channel, the eleventh input channel, the third input channel, the seventh input channel, the eighth input channel, the fourth input channel, the 16th input channel, the 15th input channel, the 14th input channel, and the 13th input channel in descending order.

In the example of FIG. 3, in the priority-gain setting table 62, the priority Pr1 is associated with a gain setting value 0x00, the priority Pr2 is associated with a gain setting value 0x0C, the priority Pr3 is associated with a gain setting value 0x18, the priority Pr4 is associated with a gain setting value 0x24, the priority Pry is associated with a gain setting value 0x30, and the priority Pr6 is associated with a gain setting value 0x3C. The priority Pr7 is associated with a gain setting value 0x48, the priority Pr8 is associated with a gain setting value 0x54, the priority Pr9 is associated with a gain setting value 0x60, the priority Pr10 is associated with a gain setting value 0x6C, the priority Pr11 is associated with a gain setting value 0x78, and the priority Pr12 is associated with a gain setting value 0x84. The priority Pr13 is associated with a gain setting value 0x90, the priority Pr14 is associated with a gain setting value 0x9C, the priority Pr15 is associated with a gain setting value 0xA8, and the priority Pr16 is associated with a gain setting value 0xB4.

In the example of FIG. 3, in the gain reference table 64, a gain value of 0 dB is associated with the gain setting value 0x00, gain values of −0.25 dB to −63.5 dB are respectively associated with the gain setting values 0x01 to 0xFE in increments of −0.25 dB, and "nosound" is associated with the gain setting value 0xFF. Here, "nosound" corresponds to a gain value of −∞dB.

The priorities Pr1 to Pr16 in the channel-priority setting table 61 are respectively linked to the priorities Pr1 to Pr16 in the priority-gain setting table 62, and the gain setting values in the priority-gain setting table 62 are respectively linked to the gain setting values in the gain reference table 64. Therefore, a gain value of −18 dB corresponding to the gain setting value 0x48 is associated with the first input channel of the priority Pr7, a gain value of −12 dB corresponding to the gain setting value 0x30 is associated with the second input channel of the priority Pry, a gain value of −24 dB corresponding to the gain setting value 0x60 is associated with the third input channel of the priority Pr9, and a gain value of −33 dB corresponding to the gain setting value 0x84 is associated with the fourth input channel of the priority Pr12. A gain value of −15 dB corresponding to the gain setting value 0x3C is associated with the fifth input channel of the priority Pr6, a gain value of −3 dB corresponding to the gain setting value 0x0C is associated with the sixth input channel of the priority Pr2, a gain value of −27 dB corresponding to the gain setting value 0x6C is associated with the seventh input channel of the priority Pr10, and a gain value of −30 dB corresponding to the gain setting value 0x78 is associated with the eighth input channel of the priority Pr11. A gain value of 0 dB corresponding to the gain setting value 0x00 is associated with the ninth input channel of the priority Pr1, a gain value of −6 dB corresponding to the gain setting value 0x18 is associated with the tenth input channel of the priority Pr3, a gain value of −21 dB corresponding to the gain setting value 0x54 is associated with the eleventh input channel of the priority Pr8, and a gain value of −9 dB corresponding to the gain setting value 0x24 is associated with the 12th input channel of the priority Pr4. A gain value of −45 dB corresponding to the gain setting value 0xB4 is associated with the 13th input channel of the priority Pr16, a gain value of −42 dB corresponding to the gain setting value 0xA8 is associated with the 14th input channel of the priority Pr15, a gain value of −39 dB corresponding to the gain setting value 0x9C is associated with the 15th input channel of the priority Pr14, and a gain value of −36 dB corresponding to the gain setting value 0x90 is associated with the 16th input channel of the priority Pr13. That is, according to the channel-priority setting table 61, the priority-gain setting table 62, and the gain reference table 64, gain values of −18 dB, −12 dB, −24 dB, −33 dB, −15 dB, −3 dB, −27 dB, −30 dB, 0 dB, −6 dB, −21 dB, −9 dB, −45 dB, −42 dB, −39 dB, and −36 dB are associated with the first to 16th input channels in this order.

In the example of FIG. 3, the lowest priority Pr10 is set in the arbitration setting information 63, the lowest priority Pr10 is a lowest priority among p priorities respectively associated with the p input channels to which the p pieces of audio data having high urgency are input, and the lowest priority Pr10 is set as a priority serving as a boundary between the p pieces of audio data having high urgency and the n−p pieces of audio data having low urgency. That is, the priority Pr10 set in the arbitration setting information 63 indicates that the number p of the audio data having high urgency is ten, ten pieces of audio data input to ten input channels respectively associated with the priorities Pr1 to Pr10 are first to tenth audio data having high urgency, and six pieces of audio data input to six input channels respectively associated with the priorities Pr11 to Pr16 are eleventh to 15th audio data having low urgency. On the other hand, the highest priority Pr11 may be set in the arbitration setting information 63, the highest priority Pr11 is a highest priority among the p priorities respectively associated with the n−p input channels to which the n−p pieces of audio data having low urgency are input, and the highest priority Pr11 may be set as a priority serving as a boundary between the p pieces of audio data having high urgency and the n−p pieces of audio data having low urgency.

In the example of FIG. 3, the audio data DI9, DI6, DI10, DI12, DI2, DI5, DI1, DIll, DI3, and DI7 respectively input to the ninth input channel, the sixth input channel, the tenth input channel, the 12th input channel, the second input channel, the fifth input channel, the first input channel, the eleventh input channel, the third input channel, and the seventh input channel associated with the priorities Pr1 to Pr10 correspond to the first to tenth audio data having high urgency. The gains G9, G6, G10, G12, G2, G5, G1, G11, G3, and G7 respectively set to the ninth input channel, the sixth input channel, the tenth input channel, the 12th channel, the second input channel, the fifth input channel, the first input channel, the eleventh input channel, the third input channel, and the seventh input channel correspond to the first to tenth gains. The audio data DI8, DI4, DI16, DI15, DI4, and DI13 respectively input to the eighth input channel, the fourth input channel, the 16th input channel, the 15th input channel, the 14th input channel, and the 13th input channel sequentially associated with the priorities Pr11 to Pr16 correspond to the eleventh to 16th audio data having low urgency. The gains G8, G4, G16, G15, G14, and G13 respectively set in the eighth input channel, the fourth input channel, the 16th input channel, the 15th input channel, the 14th input channel, and the 13th input channel correspond to the eleventh to 15th gains.

In a period in which the audio data DI9, DI6, DI10, DI12, DI2, DI5, DI1, DIll, DI3, and DI7 corresponding to the first to tenth audio data having high urgency are simultaneously played by the first audio player 3-1, the gain setting circuit 70 sets, for the gains G9, G6, G10, G12, G2, G5, G1, G11, G3, and G7 corresponding to the first to tenth gains, gain values of 0 dB, −3 dB, −6 dB, −9 dB, −12 dB, −15 dB, −18 dB, −21 dB, −24 dB, and −27 dB that are associated according to the channel-priority setting table 61, the priority-gain setting table 62, and the gain reference table 64 as described above. Accordingly, audio is obtained by synthesizing the audio data DI9, DI6, DI10, DI12, DI2, DI5, DI1, DIll, DI3, and DI7 at volumes which are higher as audio data input to an input channel having a higher priority, and the obtained audio is played by the first audio player 3-1.

In a period in which only a part of the audio data DI9, DI6, DI10, DI12, DI2, DI5, DI1, DIll, DI3, and DI7 corresponding to the first to tenth audio data having high urgency are simultaneously played by the first audio player 3-1, the gain setting circuit 70 newly sets a priority for an input channel corresponding to each piece of the audio data simultaneously played by the first audio player 3-1. Specifically, the gain setting circuit 70 refers to the channel-priority setting table 61, and resets the respective priorities Pr1, Pr2 . . . in descending order of the priorities for input channels to which audio data simultaneously played by the first audio player 3-1 is input. The respective priorities Pr1, Pr2 . . . that are reset for the input channels are linked to the priorities Pr1, Pr2 . . . of the priority-gain setting table 62 instead of the channel-priority setting table 61 by the gain setting circuit 70, and the gain setting circuit 70 sets gain values associated with gains corresponding to the input channels according to the priority-gain setting table 62 and the gain reference table 64.

In a period in which the audio data DIi of the audio data DI9, DI6, DI10, DI12, DI2, DI5, DIi, DIll, DI3, and DI7 corresponding to the first to tenth audio data having high urgency is not played by the first audio player 3-1 and is played by any one of the second to fifth audio players 3-2 to 3-5, the gain setting circuit 70 may set a gain value of 0 dB corresponding to the gain setting value 0x00 associated with the highest priority Pr1 for the gain Gi.

Further, the gain setting circuit 70 may newly set a priority to the i-th input channel corresponding to the audio data DIi in a period in which any one of the audio data DI8, DI4, DI16, DI15, DI4, and DI13 corresponding to the eleventh to 16th audio data having low urgency is played by the first audio player 3-1. For example, the gain setting circuit 70 may reset the highest priority Pr1 for the i-th input channel and set a gain value of 0 dB corresponding to the gain setting value 0x00 associated with the highest priority Pr1 to the gain Gi. On the other hand, the gain setting circuit 70 may associate the gain setting value 0x00 with the priorities Pr11 to Pr16 in, for example, the priority-gain setting table 62 without resetting the priority for the i-th input channel.

Figure 4:
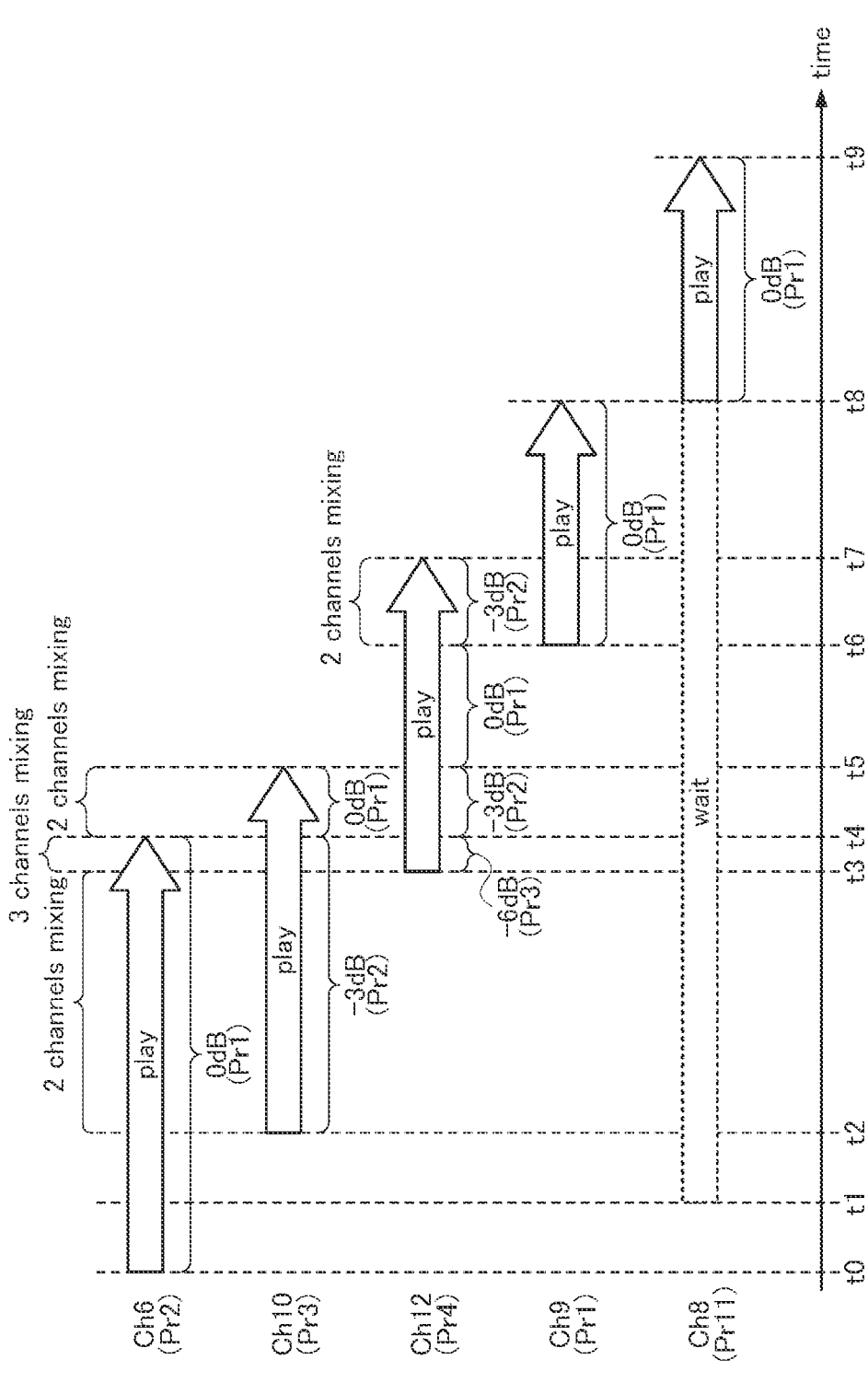
FIG. 4 is a diagram showing a specific example in which a plurality of pieces of audio data having high urgency are simultaneously played by a first audio player according to the first embodiment.

FIG. 4 shows a specific example in which a plurality of pieces of audio data having high urgency are simultaneously played by the first audio player 3-1 when the channel-priority setting table 61, the priority-gain setting table 62, the arbitration setting information 63, and the gain reference table 64 have configurations as shown in FIG. 3. In FIG. 4, Ch6, Ch9, Ch10, and Ch12 are the sixth input channel, the ninth input channel, the tenth input channel, and the 12th input channel of the mixing circuit 50, respectively.

In the example of FIG. 4, at a time t0, play of the audio data DI6 input to the sixth input channel is started. In a period from the time t0 to a time t2, since audio data played by the first audio player 3-1 is only the audio data DI6, the gain setting circuit 70 resets the highest priority Pr1 for the sixth input channel. The gain setting circuit 70 sets a gain value of 0 dB corresponding to the gain setting value 0x00 associated with the priority Pr1 for the gain G6.

Next, at a time t1 at which the audio data DI6 having high urgency is being played, the communication interface circuit 10 receives an audio play command for the audio source data 21-8, and the decoder 30 outputs the audio data DI8 obtained by demodulating the audio source data 21-8. Since the audio data DI8 is audio data having low urgency, the arbitration circuit 40 holds the audio data DI8 without outputting the audio data DI8 to the eighth input channel of the mixing circuit 50.

Next, at the time t2, play of the audio data DI10 having high urgency input to the tenth input channel is started. Accordingly, in a period from the time t2 to a time t3, the audio data DI6 and the audio data DI10 are simultaneously played by the first audio player 3-1. Since the priority Pr2 associated with the sixth input channel is higher than the priority Pr3 associated with the tenth input channel, the gain setting circuit 70 resets the highest priority Pr1 for the sixth input channel and resets the second highest priority Pr2 for the tenth input channel. The gain setting circuit 70 sets a gain value of 0 dB corresponding to the gain setting value 0x00 associated with the priority Pr1 for the gain G6, and sets a gain value of –3 dB corresponding to the gain setting value 0x0C associated with the priority Pr2 for the gain G10.

Next, at the time t3, play of the audio data DI12 having high urgency input to the 12th input channel is started. Accordingly, in a period from the time t3 to a time t4, the audio data DI6, the audio data DI10, and the audio data DI12 are simultaneously played by the first audio player 3-1. Since the priority Pr2 associated with the sixth input channel is higher than the priority Pr3 associated with the tenth input channel and the priority Pr4 associated with the 12th input channel, and the priority Pr3 associated with the tenth input channel is higher than the priority Pr4 associated with the 12th input channel, the gain setting circuit 70 resets the highest priority Pr1 for the sixth input channel, resets the second highest priority Pr2 for the tenth input channel, and resets the third highest priority Pr3 for the 12th input channel. The gain setting circuit 70 sets a gain value of 0 dB corresponding to the gain setting value 0x00 associated with the priority Pr1 for the gain G6, sets a gain value of –3 dB corresponding to the gain setting value 0x0C associated with the priority Pr2 for the gain G10, and sets a gain value of –6 dB corresponding to the gain setting value 0x18 associated with the priority Pr3 for the gain G12.

Next, at the time t4, play of the audio data DI6 is stopped. Accordingly, in a period from the time t4 to a time t5, the audio data DI10 and the audio data DI12 are simultaneously played by the first audio player 3-1. Since the priority Pr3 associated with the tenth input channel is higher than the priority Pr4 associated with the 12th input channel, the gain setting circuit 70 resets the highest priority Pr1 for the tenth input channel and resets the second highest priority Pr2 for the 12th input channel. The gain setting circuit 70 sets a gain value of 0 dB corresponding to the gain setting value 0x00 associated with the priority Pr1 for the gain G10, and sets a gain value of –3 dB corresponding to the gain setting value 0x0C associated with the priority Pr2 for the gain G12.

In this manner, during play of the audio data DI6, DI10, and DI12 with the gain values of 0 dB, –3 dB, and –6 dB being respectively set for the gains G6, G10, and G12, when the play of the audio data DI6 having a higher priority than the audio data DI10 and DI12 is stopped at the time t4, the gain setting circuit 70 sets the gains G10 and G12 to have gain values of 0 dB and –3 dB which are higher than and are different from the respective gain values of –3 dB and –6 dB. The gain values of –3 dB and –6 dB respectively set to the gains G10 and G12 before the play of the audio data DI6 is stopped are examples of a "first value", and the gain values of 0 dB and –3 dB respectively set to the gains G10 and G12 after the play of the audio data DI6 is stopped are examples of a "second value".

At the time t4, even when the play of the audio data DI6 having high urgency is stopped, since the audio data DI10 and DI12 having high urgency are being played, the arbitration circuit 40 holds the audio data DI8 having low urgency without outputting the audio data DI8 having low urgency to the eighth input channel of the mixing circuit 50.

Next, at the time t5, the play of the audio data DI10 is stopped. Accordingly, in a period from the time t5 to a time t6, since audio data played by the first audio player 3-1 is only the audio data DI12, the gain setting circuit 70 resets the highest priority Pr1 for the 12th input channel. The gain setting circuit 70 sets a gain value of 0 dB corresponding to the gain setting value 0x00 associated with the priority Pr1 for the gain G12.

In this manner, during play of the audio data DI10 and DI12 with the gain values of 0 dB and –3 dB being respectively set to the gains G10 and G12, when the play of the audio data DI10 having a higher priority than the audio data DI12 is stopped at the time t5, the gain setting circuit 70 sets the gain G12 to have a gain value of 0 dB which is higher than and is different from the gain value of –3 dB. The gain value of –3 dB set to the gain G12 before the play of the audio data DI10 is stopped is an example of a "first value", and the gain value of 0 dB set to the gain G12 after the play of the audio data DI10 is stopped is an example of a "second value".

At the time t5, even when the play of the audio data DI10 having high urgency is stopped, since the audio data DI12 having high urgency is being played, the arbitration circuit 40 holds the audio data DI8 having low urgency without outputting the audio data DI8 having low urgency to the eighth input channel of the mixing circuit 50.

At the time t6, play of the audio data DI9 input to the ninth input channel is started. Accordingly, in a period from the time t6 to a time t7, the audio data DI12 and the ninth audio data DI9 are simultaneously played by the first audio player 3-1. Since the priority Pr1 associated with the ninth input channel is higher than the priority Pr4 associated with the 12th input channel, the gain setting circuit 70 resets the highest priority Pr1 for the ninth input channel and resets the second highest priority Pr2 for the 12th input channel. The gain setting circuit 70 sets a gain value of 0 dB corresponding to the gain setting value 0x00 associated with the priority Pr1 for the gain G9, and sets a gain value of −3 dB corresponding to the gain setting value 0x0C associated with the priority Pr2 for the gain G12.

In this manner, during play of the audio data DI12 with the gain values of 0 dB being set to the gain G12, when the play of the audio data DI9 having a higher priority than the audio data DI12 is stopped at the time t6, the gain setting circuit 70 sets the gain G12 to have a gain value of −3 dB which is lower than and is different from the gain value of 0 dB. The gain value of 0 dB set to the gain G12 before the play of the audio data DI9 is started is an example of a "first value", and the gain value of −3 dB set to the gain G12 after the play of the audio data DI9 is started is an example of a "second value".

Next, at the time t7, the play of the audio data DI12 is stopped. Accordingly, in a period from the time t7 to a time t8 at which the play of the audio data DI9 is stopped, since the audio data played by the first audio player 3-1 is only the audio data DI9, the gain setting circuit 70 resets the highest priority Pr1 for the ninth input channel. The gain setting circuit 70 sets a gain value of 0 dB corresponding to the gain setting value 0x00 associated with the priority Pr1 for the gain G9.

At the time t7, even when the play of the audio data DI12 having high urgency is stopped, since the audio data DI9 having high urgency is being played, the arbitration circuit 40 holds the audio data DI8 having low urgency without outputting the audio data DI8 having low urgency to the eighth input channel of the mixing circuit 50.

Next, at the time t8, the play of the audio data DI9 is stopped. Accordingly, since none of the ten pieces of audio data DI9, DI6, DI10, DI12, DI2, DI5, DI1, DI11, DI3, and DI7 having high urgency is being played, the arbitration circuit 40 outputs the held audio data DI8 having low urgency to the eighth input channel of the mixing circuit 50 and play of the audio data DI8 is started. In a period from the time t8 to a time t9 at which the play of the audio data DI8 is stopped, since audio data played by the first audio player 3-1 is only the audio data DI8, the gain setting circuit 70 resets the highest priority Pr1 for the eighth input channel. The gain setting circuit 70 sets a gain value of 0 dB corresponding to the gain setting value 0x00 associated with the priority Pr1 for the gain G8.

As described above, in the embodiment, in a case where the j-th audio data included in the first to p-th audio data having high urgency is being played, when the arbitration circuit 40 receives a command for starting play of the i-th audio data having high urgency, the arbitration circuit 40 starts input of the i-th audio data to the mixing circuit 50 and continues input of the j-th audio data to the mixing circuit 50. Therefore, the mixing circuit 50 outputs the mixing signal DO1 obtained by mixing the i-th audio data with the j-th audio data. As a result, the i-th audio data and the j-th audio data having high urgency are played without delay.

On the other hand, in a case where the j-th audio data included in the first to p-th audio data having high urgency is being played, when the arbitration circuit 40 receives a command for starting play of the k-th audio data included in the (p+1)-th to n-th audio data having low urgency, the arbitration circuit 40 delays input of the k-th audio data to the mixing circuit 50 until the play of the j-th audio data is ended. Further, at a time when the play of the j-th audio data having high urgency is ended, if the i-th audio data having high urgency is being played, the arbitration circuit 40 delays the input of the k-th audio data to the mixing circuit 50 until the play of the i-th audio data is ended. That is, in a case where the j-th audio data having high urgency is being played, when the arbitration circuit 40 receives a command for starting play of the k-th audio data having low urgency, the arbitration circuit 40 starts the input of the k-th audio data to the mixing circuit 50 after waiting until none of the first to p-th audio data having high urgency is being played. Accordingly, when none of the first to p-th audio data having high urgency is being played, the k-th audio data having low urgency is played.

Figure 5:
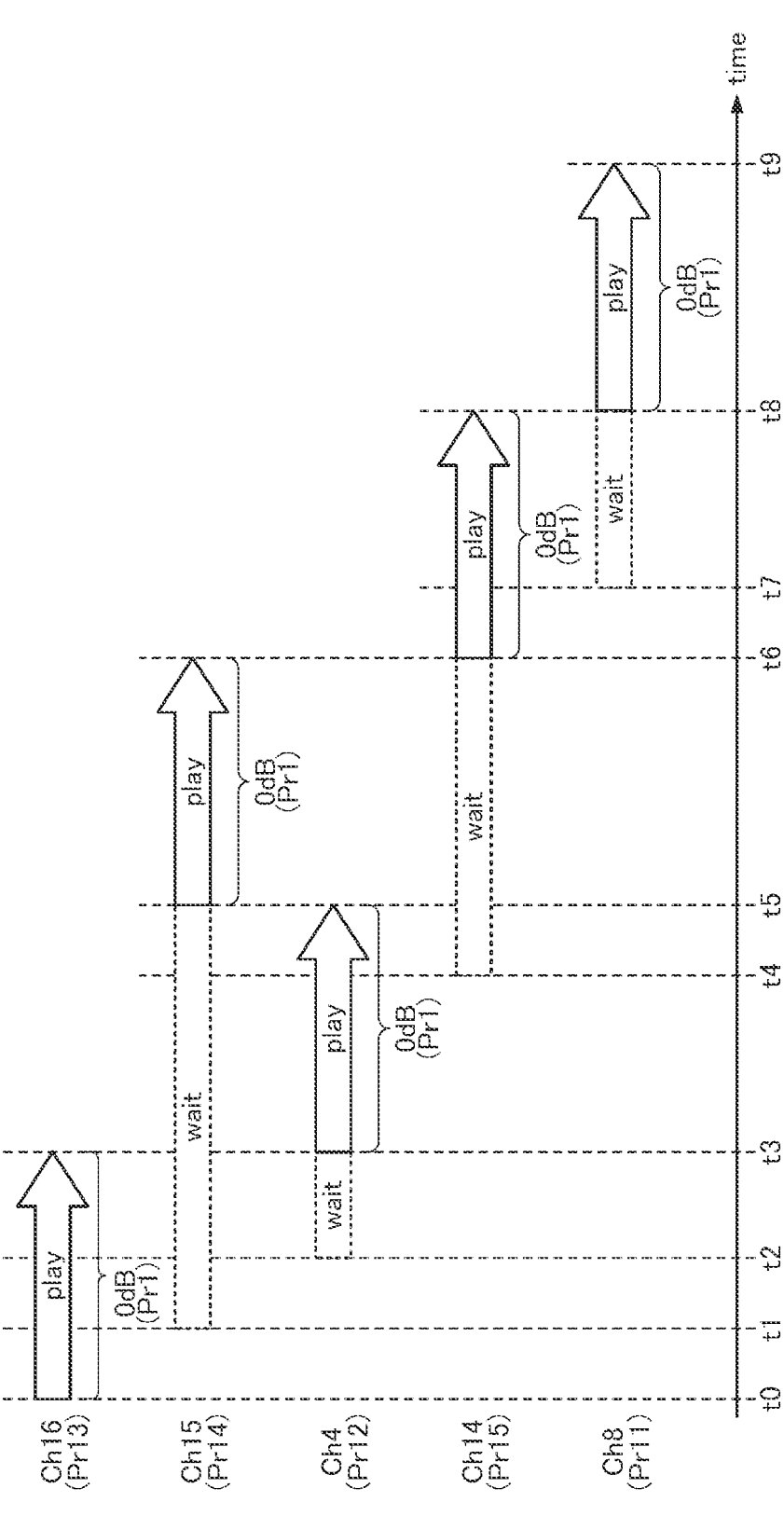
FIG. 5 is a diagram showing a specific example in which a plurality of pieces of audio data having low urgency are simultaneously played by the first audio player according to the first embodiment.

FIG. 5 shows a specific example in which a plurality of pieces of audio data having low urgency are played by the first audio player 3-1 when the channel-priority setting table 61, the priority-gain setting table 62, the arbitration setting information 63, and the gain reference table 64 have configurations as shown in FIG. 3. In FIG. 5, Ch16, Ch15, Ch4, Ch14, and Ch8 are the 16th input channel, the 15th input channel, the fourth input channel, the 14th input channel, and the eighth input channel of the mixing circuit 50, respectively.

In the example of FIG. 5, at a time t0, play of the audio data DI16 input to the 16th input channel is started. In a period from the time t0 to a time t3, since audio data played by the first audio player 3-1 is only the audio data DI16, the gain setting circuit 70 resets the highest priority Pr1 for the 16th input channel. The gain setting circuit 70 sets a gain value of 0 dB corresponding to the gain setting value 0x00 associated with the priority Pr1 for the gain G16.

Next, at a time t1 at which the audio data DI16 having low urgency is being played, the communication interface circuit 10 receives an audio play command for the audio source data 21-15, and the decoder 30 outputs the audio data DI15 obtained by demodulating the audio source data 21-15. Since the audio data DI15 is audio data having low urgency, the arbitration circuit 40 holds the audio data DI15 without outputting the audio data DI15 to the 15th input channel of the mixing circuit 50.

Next, at a time t2 at which the audio data DI16 having low urgency is being played, the communication interface circuit 10 receives an audio play command for the audio source data 21-4, and the decoder 30 outputs the audio data DI4 obtained by demodulating the audio source data 21-4. Since the audio data DI4 is audio data having low urgency, the arbitration circuit 40 holds the audio data DI4 without outputting the audio data DI4 to the fourth input channel of the mixing circuit 50.

Next, at the time t3, the play of the audio data DI16 is stopped. At this time, since the priority Pr12 associated with the fourth input channel is higher than the priority Pr14 associated with the 15th input channel, between the audio data DI15 and DI4 that have low urgency and are held by the arbitration circuit 40, the arbitration circuit 40 outputs the audio data DI4 to the fourth input channel of the mixing circuit 50, and the play of the audio data DI4 is started. In a period from the time t3 to a time t5 at which the play of the audio data DI4 is stopped, since audio data played by the first audio player 3-1 is only the audio data DI4, the gain setting circuit 70 resets the highest priority Pr1 for the fourth input channel. The gain setting circuit 70 sets a gain value of 0 dB corresponding to the gain setting value 0x00 associated with the priority Pr1 for the gain G4.

Next, at a time t4 at which the audio data DI4 having low urgency is being played, the communication interface circuit 10 receives an audio play command for the audio source data 21-14, and the decoder 30 outputs the audio data DI14 obtained by demodulating the audio source data 21-14. Since the audio data DI14 is audio data having low urgency, the arbitration circuit 40 holds the audio data DI14 without outputting the audio data DI14 to the 14th input channel of the mixing circuit 50.

Next, at the time t5, the play of the audio data DI4 is stopped. At this time, since the priority Pr14 associated with the 15th input channel is higher than the priority Pr15 associated with the 14th input channel, between the audio data DI15 and DI14 that have low urgency and are held by the arbitration circuit 40, the arbitration circuit 40 outputs the audio data DI15 to the 15th input channel of the mixing circuit 50, and the play of the audio data DI15 is started. In a period from the time t5 to a time t6 at which the play of the audio data DI15 is stopped, since audio data played by the first audio player 3-1 is only the audio data DI15, the gain setting circuit 70 resets the highest priority Pr1 for the 15th input channel. The gain setting circuit 70 sets a gain value of 0 dB corresponding to the gain setting value 0x00 associated with the priority Pr1 for the gain G15.

Next, at the time t6, the play of the audio data DI15 is stopped. Accordingly, the arbitration circuit 40 outputs the audio data DI14 having low urgency that is held by the arbitration circuit 40 to the 14th input channel of the mixing circuit 50, and the play of the audio data DI14 is started. In a period from the time t6 to a time t8 at which the play of the audio data D114 is stopped, since audio data played by the first audio player 3-1 is only the audio data D114, the gain setting circuit 70 resets the highest priority Pr1 for the 14th input channel. The gain setting circuit 70 sets a gain value of 0 dB corresponding to the gain setting value 0x00 associated with the priority Pr1 for the gain G14.

Next, at a time t7 at which the audio data D114 having low urgency is being played, the communication interface circuit 10 receives an audio play command for the audio source data 21-8, and the decoder 30 outputs the audio data D18 obtained by demodulating the audio source data 21-8. Since the audio data D18 is audio data having low urgency, the arbitration circuit 40 holds the audio data D18 without outputting the audio data D18 to the eighth input channel of the mixing circuit 50.

Next, at the time t8, the play of the audio data D114 is stopped. Accordingly, the arbitration circuit 40 outputs the audio data D18 having low urgency that is held by the arbitration circuit 40 to the eighth input channel of the mixing circuit 50, and the play of the audio data D18 is started. Accordingly, in a period from the time t8 to a time t9 at which the play of the audio data D18 is stopped, since audio data played by the first audio player 3-1 is only the audio data D18, the gain setting circuit 70 resets the highest priority Pr1 for the eighth input channel. The gain setting circuit 70 sets a gain value of 0 dB corresponding to the gain setting value 0x00 associated with the priority Pr1 for the gain G8.

In the example of FIG. 5, at the time t3 and the time t5, although the arbitration circuit 40 gives priority to the play of audio data having a higher priority between the two pieces of audio data having low urgency that are held by the arbitration circuit 40, the arbitration circuit 40 may give priority to play of audio data for which holding is started at an earlier time. In this case, the audio data DI16, DI15, DI4, DI14, and DI8 are played in this order.

In this manner, in the embodiment, in a case where the j-th audio data included in the (p+1)-th to n-th audio data having low urgency is being played, when the arbitration circuit 40 receives a command for starting play of the k-th audio data having low urgency, the arbitration circuit 40 delays input of the k-th audio data to the mixing circuit 50 until the play of the j-th audio data is ended. As a result, both the j-th audio data and the k-th audio data are independently played. Further, at a time at which the play of the j-th audio data having low urgency is ended, when there is a request to play the i-th audio data having low urgency and having a priority higher than the priority of the k-th audio data, the arbitration circuit 40 may start input of the i-th audio data to the mixing circuit 50 and delay input of the k-th audio data to the mixing circuit 50 until the play of the i-th audio data is ended. That is, in a case where the j-th audio data having low urgency is being played, when the arbitration circuit 40 receives a command for starting the play of the k-th audio data having low urgency, the arbitration circuit 40 starts input of the k-th audio data to the mixing circuit 50 after waiting until none of audio data having low urgency and having a priority higher than the priority of the k-th audio data is being played. As a result, when play of a plurality of pieces of audio data having low urgency is kept waiting, each piece of audio data is independently played in descending order of priority.

In the audio mixing device 1 according to the first embodiment described above, the mixing circuit 50 outputs the mixing signal DO1 obtained by mixing a plurality of pieces of to-be-displayed audio data included in the first to p-th audio data having high urgency, and the audio amplifier 80 converts the mixing signal DO1 into the audio signal DO1X and outputs the audio signal DO1X to the first audio player 3-1. Therefore, according to the audio mixing device 1 of the first embodiment, the first audio player 3-1 can play a plurality of pieces of to-be-played audio data included in the first to p-th audio data without delay.

According to the audio mixing device 1 of the first embodiment, the arbitration circuit 40 can determine whether the audio data to be played needs to be mixed based on the channel-priority setting table 61 and the arbitration setting information 63 that are stored in the storage circuit 60. The micro-control unit 2 sets the channel-priority setting table 61 and the arbitration setting information 63 such that it is possible to freely select whether each piece of audio data is to be mixed.

According to the audio mixing device 1 of the first embodiment, since the gain setting circuit 70 sets the first to p-th gains instead of the same gain for the first to p-th audio data having high urgency, a user can easily distinguish a plurality of pieces of audio data to be simultaneously played. In particular, for the plurality of pieces of audio data to be simultaneously played, the gain setting circuit 70 sets a high gain for audio data having a high priority, so that the user can easily hear the audio data having a higher priority.

In the audio mixing device 1 of the first embodiment, during play of the j-th audio data of the first to p-th audio data having high urgency with a first value being set to the j-th gain of the first to p-th gains, when the gain setting circuit 70 receives a command for starting or stopping play of audio data having a higher priority than the j-th audio data of the first to p-th audio data, the gain setting circuit 70 sets the j-th gain to a second value different from the first value. Therefore, according to the audio mixing device 1 of the first embodiment, when the priority of the j-th audio data during play increases or decreases, a play volume of the j-th audio data can be appropriately changed.

According to the audio mixing device 1 of the first embodiment, since play of the k-th audio data included in the (p+1)-th to n-th audio data having low urgency can be delayed until play of the j-th audio data included in the first to p-th audio data having high urgency is ended, it is possible to reduce a possibility that user's hearing of played audio of the k-th audio data having low urgency is hindered by played audio of the j-th audio data having high urgency.

The audio mixing device 1 according to the first embodiment includes the memory 20 configured to store the audio source data 21-1 to 21-n that serve as the base of the audio data DI1 to DIn. Therefore, according to the audio mixing device 1 of the first embodiment, since it is not necessary to acquire the audio source data 21-1 to 21-n from the outside, it is possible to advance a timing when play of the audio data DI1 to DIn is started.

1-2. Second Embodiment

Hereinafter, in the audio mixing device 1 according to a second embodiment, the same components as those in the first embodiment will be denoted by the same reference numerals, description similar to that in the first embodiment will be omitted or simplified, and content different from that in the first embodiment will be mainly described.

Since a configuration of the audio mixing device 1 according to the second embodiment is the same as the configuration shown in FIG. 1, illustration and description thereof will be omitted. Since a configuration of the mixing circuit 50 according to the second embodiment is the same as the configuration shown in FIG. 2, illustration and description thereof will be omitted.

Although there is no limitation for an operation of the arbitration circuit 40 when the arbitration circuit 40 receives the command for starting the play of the j-th audio data included in the first to p-th audio data having high urgency during the play of the k-th audio data included in the (p+1)-th to n-th audio data having low urgency in the first embodiment, the arbitration circuit 40 is operated in an arbitration mode set in the arbitration setting information 63 in the second embodiment.

Specifically, in a case where the arbitration circuit 40 receives a command for starting play of the j-th audio data having high urgency during play of the k-th audio data having low urgency, when a first arbitration mode is set in the arbitration setting information 63, the arbitration circuit 40 starts the input of the j-th audio data to the mixing circuit 50 and continues the input of the k-th audio data to the mixing circuit 50. Therefore, the mixing circuit 50 outputs the mixing signal DO1 obtained by mixing the j-th audio data with the k-th audio data. As a result, the j-th audio data and the k-th audio data are simultaneously played by the first audio player 3-1. In this case, the gain setting circuit 70 sets the k-th gain to have a value smaller than a value of the j-th gain, so that a volume of the j-th audio data having high urgency is smaller than a volume of the k-th audio data having low urgency.

In a case where the arbitration circuit 40 receives a command for starting play of the j-th audio data having high urgency during play of the k-th audio data having low urgency, when a second arbitration mode is set in the arbitration setting information 63, the arbitration circuit 40 starts the input of the j-th audio data to the mixing circuit 50, stops the input of the k-th audio data to the mixing circuit 50, and starts the input of the k-th audio data to the mixing circuit 50 from the beginning after the input of the j-th audio data to the mixing circuit 50 is ended. Therefore, after the mixing circuit 50 outputs the mixing signal DO1 that includes the j-th audio data and does not include the k-th audio data, the mixing circuit 50 again outputs the mixing signal DO1 that includes the k-th audio data and does not include the j-th audio data. As a result, the first audio player 3-1 plays the j-th audio data and then plays the k-th audio data.

In a case where the arbitration circuit 40 receives a command for starting play of the j-th audio data having high urgency during play of the k-th audio data having low urgency, when a third arbitration mode is set in the arbitration setting information 63, the arbitration circuit 40 starts the input of the j-th audio data to the mixing circuit 50, interrupts the input of the k-th audio data to the mixing circuit 50, and restarts the input of the k-th audio data to the mixing circuit 50 from an interrupted position after the input of the j-th audio data to the mixing circuit 50 is ended. Therefore, the mixing circuit 50 outputs the mixing signal DO1 that includes the j-th audio data and does not include the k-th audio data in a part of a period from the start to the end of the output of the mixing signal DO1 that includes the k-th audio data and does not include the j-th audio data. As a result, play of the k-th audio data played by the first audio player 3-1 is interrupted, and the j-th audio data is played by the first audio player 3-1.

Figure 6:
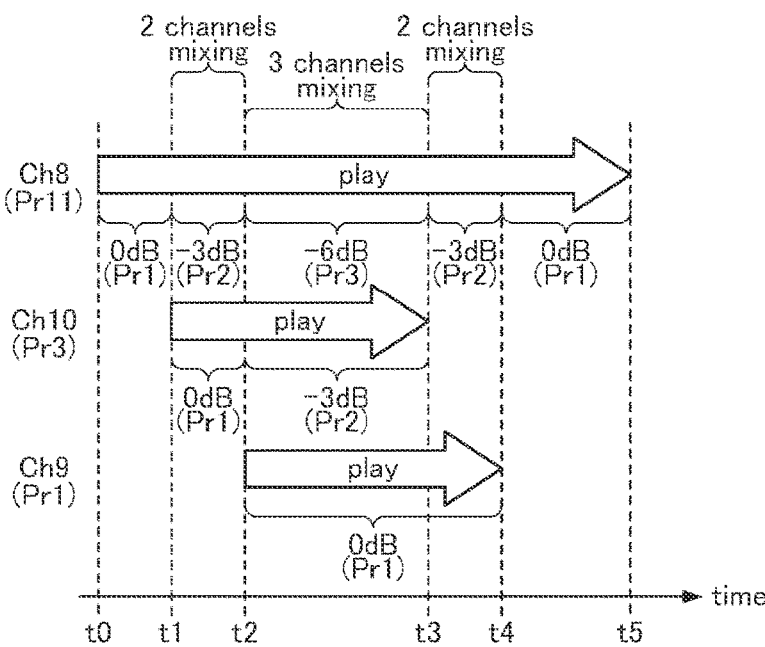
FIG. 6 is a diagram showing a specific example in which audio data having high urgency is played by the first audio player during play of audio data having low urgency according to a second embodiment.

FIG. 6 shows a specific example in which the first audio player 3-1 plays audio data having high urgency during play of audio data having low urgency when the first arbitration mode is set in the arbitration setting information 63. In the example of FIG. 6, the channel-priority setting table 61, the priority-gain setting table 62, the arbitration setting information 63, and the gain reference table 64 have configurations as shown in FIG. 3.

In the example of FIG. 6, at a time t0, play of the audio data DI8 having low urgency input to the eighth input channel is started. In a period from the time t0 to a time t1, since the audio data played by the first audio player 3-1 is only the audio data DI8, the gain setting circuit 70 resets the highest priority Pr1 for the eighth input channel. The gain setting circuit 70 sets a gain value of 0 dB corresponding to the gain setting value 0x00 associated with the priority Pr1 for the gain G8.

Next, at the time t1, play of the audio data DI10 having high urgency input to the tenth input channel is started. Accordingly, in a period from the time t1 to a time t2, the audio data DI8 and the audio data DI10 are simultaneously played by the first audio player 3-1. Since the priority Pr3 associated with the tenth input channel is higher than the priority Pr11 associated with the eighth input channel, the gain setting circuit 70 resets the highest priority Pr1 for the tenth input channel and resets the second highest priority Pr2 for the eighth input channel. The gain setting circuit 70 sets a gain value of 0 dB corresponding to the gain setting value 0x00 associated with the priority Pr1 for the gain G10, and sets a gain value of −3 dB corresponding to the gain setting value 0x0C associated with the priority Pr2 for the gain G8.

Next, at the time t2, play of the audio data DI9 having high urgency input to the ninth input channel is started. Accordingly, in a period from the time t2 to a time t3, the audio data DI8, the audio data DI10, and the audio data DI9 are simultaneously played by the first audio player 3-1. Since the priority Pr1 associated with the ninth input channel is higher than the priority Pr3 associated with the tenth input channel and the priority Pr11 associated with the eighth input channel, and the priority Pr3 associated with the tenth input channel is higher than the priority Pr11 associated with the eighth input channel, the gain setting circuit 70 resets the highest priority Pr1 for the ninth input channel, resets the second highest priority Pr2 for the tenth input channel, and resets the third highest priority Pr3 for the eighth input channel. The gain setting circuit 70 sets a gain value of 0 dB corresponding to the gain setting value 0x00 associated with the priority Pr1 for the gain G9, sets a gain value of –3 dB corresponding to the gain setting value 0x0C associated with the priority Pr2 for the gain G10, and sets a gain value of –6 dB corresponding to the gain setting value 0x18 associated with the priority Pr3 for the gain G8.

Next, at the time t3, the play of the audio data DI10 is stopped. Accordingly, in a period from the time t3 to a time t4, the audio data DI8 and the audio data DI9 are simultaneously played by the first audio player 3-1. Since the priority Pr1 associated with the ninth input channel is higher than the priority Pr11 associated with the eighth input channel, the gain setting circuit 70 resets the highest priority Pr1 for the ninth input channel and resets the second highest priority Pr2 for the eighth input channel. The gain setting circuit 70 sets a gain value of 0 dB corresponding to the gain setting value 0x00 associated with the priority Pr1 for the gain G9, and sets a gain value of –3 dB corresponding to the gain setting value 0x0C associated with the priority Pr2 for the gain G8.

Next, at the time t4, the play of the audio data DI9 is stopped. Accordingly, in a period from the time t4 to a time t5 at which the play of the audio data DI8 is stopped, since the audio data played by the first audio player 3-1 is only the audio data DI8, the gain setting circuit 70 resets the highest priority Pr1 for the eighth input channel. The gain setting circuit 70 sets a gain value of 0 dB corresponding to the gain setting value 0x00 associated with the priority Pr1 for the gain G8.

In this manner, in the embodiment, in a case where the arbitration circuit 40 receives a command for starting play of the j-th audio data having high urgency during play of the k-th audio data having low urgency, when the first arbitration mode is set in the arbitration setting information 63, the arbitration circuit 40 starts the input of the j-th audio data to the mixing circuit 50 and continues the input of the k-th audio data to the mixing circuit 50. Therefore, the mixing circuit 50 outputs the mixing signal DO1 obtained by mixing the j-th audio data with the k-th audio data. As a result, the j-th audio data having high urgency and the k-th audio data having low urgency are played without delay.

Figure 7:
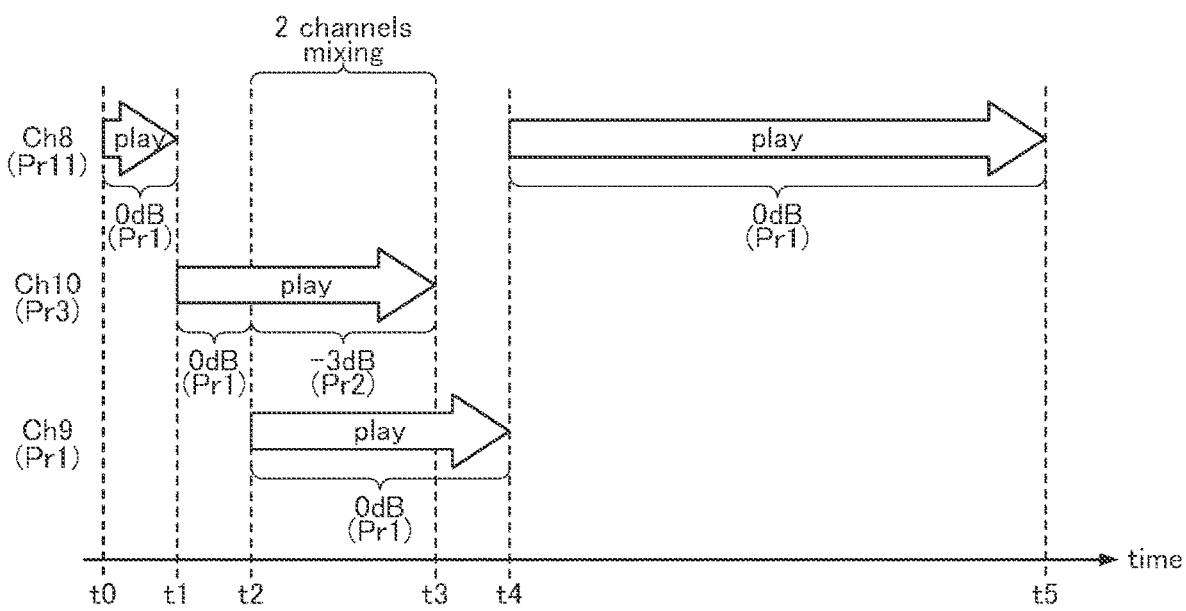
FIG. 7 is a diagram showing another specific example in which audio data having high urgency is played by the first audio player during play of audio data having low urgency according to the second embodiment.

FIG. 7 shows a specific example in which the first audio player 3-1 plays audio data having high urgency during play of audio data having low urgency when the second arbitration mode is set in the arbitration setting information 63. In the example of FIG. 7, the channel-priority setting table 61, the priority-gain setting table 62, the arbitration setting information 63, and the gain reference table 64 have configurations as shown in FIG. 3.

In the example of FIG. 7, at a time t0, play of the audio data DI8 having low urgency input to the eighth input channel is started. In a period from the time t0 to a time t1, since the audio data played by the first audio player 3-1 is only the audio data DI8, the gain setting circuit 70 resets the highest priority Pr1 for the eighth input channel. The gain setting circuit 70 sets a gain value of 0 dB corresponding to the gain setting value 0x00 associated with the priority Pr1 for the gain G8.

Next, at the time t1, play of the audio data DI10 having high urgency input to the tenth input channel is started, and play of the audio data DI8 having low urgency is stopped. Accordingly, in a period from the time t1 to a time t2, since the audio data played by the first audio player 3-1 is only the audio data DI10, the gain setting circuit 70 resets the highest priority Pr1 for the tenth input channel. The gain setting circuit 70 sets a gain value of 0 dB corresponding to the gain setting value 0x00 associated with the priority Pr1 for the gain G10.

Next, at the time t2, play of the audio data DI9 having high urgency input to the ninth input channel is started. Accordingly, in a period from the time t2 to a time t3, the audio data DI10 and the audio data DI9 are simultaneously played by the first audio player 3-1. Since the priority Pr1 associated with the ninth input channel is higher than the priority Pr3 associated with the tenth input channel, the gain setting circuit 70 resets the highest priority Pr1 for the ninth input channel and resets the second highest priority Pr2 for the tenth input channel. The gain setting circuit 70 sets a gain value of 0 dB corresponding to the gain setting value 0x00 associated with the priority Pr1 for the gain G9, and sets a gain value of –3 dB corresponding to the gain setting value 0x0C associated with the priority Pr2 for the gain G10.

Next, at the time t3, the play of the audio data DI10 is stopped. Accordingly, in a period from the time t3 to a time t4, since the audio data played by the first audio player 3-1 is only the audio data DI9, the gain setting circuit 70 resets the highest priority Pr1 for the ninth input channel. The gain setting circuit 70 sets a gain value of 0 dB corresponding to the gain setting value 0x00 associated with the priority Pr1 for the gain G9.

Next, at the time t4, the play of the audio data DI9 is stopped, and the play of the audio data DI8 having low urgency is started from the beginning. Accordingly, in a period from the time t4 to a time t5 at which the play of the audio data DI8 is stopped, since the audio data played by the first audio player 3-1 is only the audio data DI8, the gain setting circuit 70 resets the highest priority Pr1 for the eighth input channel. The gain setting circuit 70 sets a gain value of 0 dB corresponding to the gain setting value 0x00 associated with the priority Pr1 for the gain G8.

In this manner, in the embodiment, in a case where the arbitration circuit 40 receives a command for starting play of the j-th audio data having high urgency during play of the k-th audio data having low urgency, when the second arbitration mode is set in the arbitration setting information 63, the arbitration circuit 40 starts the input of the j-th audio data to the mixing circuit 50, stops the input of the k-th audio data to the mixing circuit 50, and starts the input of the k-th audio data to the mixing circuit 50 from the beginning after the input of the j-th audio data to the mixing circuit 50 is ended. Therefore, after the mixing circuit 50 outputs the mixing signal DO1 that includes the j-th audio data and does not include the k-th audio data, the mixing circuit 50 again outputs the mixing signal DO1 that includes the k-th audio data and does not include the j-th audio data. As a result, after the j-th audio data having high urgency is played without delay by the first audio player 3-1, the k-th audio data having low urgency is played from the beginning. The arbitration circuit 40 holds the k-th audio data input from the decoder 30 from the beginning, and outputs the held k-th audio data to the mixing circuit 50 from the beginning after the play of the j-th audio data is ended.

Figure 8:
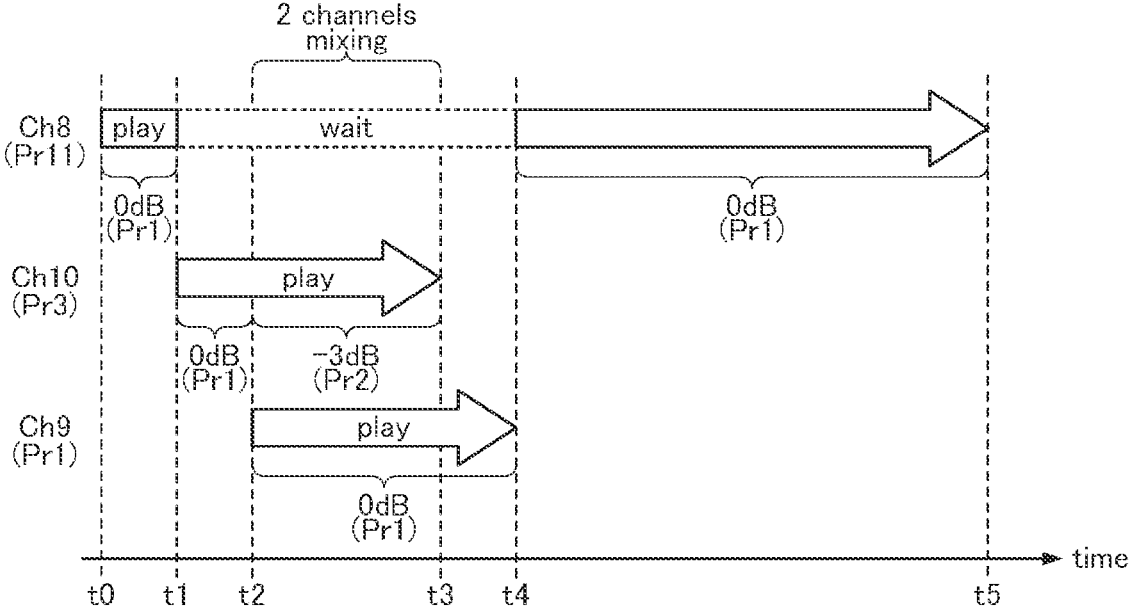
FIG. 8 is a diagram showing another specific example in which audio data having high urgency is played by the first audio player during play of audio data having low urgency according to the second embodiment.

FIG. 8 shows a specific example in which the first audio player 3-1 plays audio data having high urgency during play of audio data having low urgency when the third arbitration mode is set in the arbitration setting information 63. In the example of FIG. 8, the channel-priority setting table 61, the priority-gain setting table 62, the arbitration setting information 63, and the gain reference table 64 have configurations as shown in FIG. 3.

In the example of FIG. 8, at a time t0, play of the audio data DI8 having low urgency input to the eighth input channel is started. In a period from the time t0 to a time t1, since the audio data played by the first audio player 3-1 is only the audio data DI8, the gain setting circuit 70 resets the highest priority Pr1 for the eighth input channel. The gain setting circuit 70 sets a gain value of 0 dB corresponding to the gain setting value 0x00 associated with the priority Pr1 for the gain G8.

Next, at the time t1, play of the audio data DI10 having high urgency input to the tenth input channel is started, and the play of the audio data DI8 having low urgency is interrupted. Accordingly, in a period from the time t1 to a time t2, since the audio data played by the first audio player 3-1 is only the audio data DI10, the gain setting circuit 70 resets the highest priority Pr1 for the tenth input channel. The gain setting circuit 70 sets a gain value of 0 dB corresponding to the gain setting value 0x00 associated with the priority Pr1 for the gain G10.

Next, at the time t2, play of the audio data DI9 having high urgency input to the ninth input channel is started. Accordingly, in a period from the time t2 to a time t3, the audio data DI10 and the audio data DI9 are simultaneously played by the first audio player 3-1. Since the priority Pr1 associated with the ninth input channel is higher than the priority Pr3 associated with the tenth input channel, the gain setting circuit 70 resets the highest priority Pr1 for the ninth input channel and resets the second highest priority Pr2 for the tenth input channel. The gain setting circuit 70 sets a gain value of 0 dB corresponding to the gain setting value 0x00 associated with the priority Pr1 for the gain G9, and sets a gain value of −3 dB corresponding to the gain setting value 0x0C associated with the priority Pr2 for the gain G10.

Next, at the time t3, the play of the audio data DI10 is stopped. Accordingly, in a period from the time t3 to a time t4, since the audio data played by the first audio player 3-1 is only the audio data DI9, the gain setting circuit 70 resets the highest priority Pr1 for the ninth input channel. The gain setting circuit 70 sets a gain value of 0 dB corresponding to the gain setting value 0x00 associated with the priority Pr1 for the gain G9.

Next, at the time t4, the play of the audio data DI9 is stopped, and the play of the audio data DI8 having low urgency is started from the interrupted position at the time t1. Accordingly, in a period from the time t4 to a time t5 at which the play of the audio data DI8 is stopped, since the audio data played by the first audio player 3-1 is only the audio data DI8, the gain setting circuit 70 resets the highest priority Pr1 for the eighth input channel. The gain setting circuit 70 sets a gain value of 0 dB corresponding to the gain setting value 0x00 associated with the priority Pr1 for the gain G8.

In this manner, in the embodiment, a case where the arbitration circuit 40 receives a command for starting play of the j-th audio data having high urgency during play of the k-th audio data having low urgency, when the third arbitration mode is set in the arbitration setting information 63, the arbitration circuit 40 starts the input of the j-th audio data to the mixing circuit 50, interrupts the input of the k-th audio data to the mixing circuit 50, and restarts the input of the k-th audio data to the mixing circuit 50 from an interrupted position after the input of the j-th audio data to the mixing circuit 50 is ended. Therefore, the mixing circuit 50 outputs the mixing signal DO1 that includes the j-th audio data and does not include the k-th audio data in a part of a period from the start to the end of the output of the mixing signal DO1 that includes the k-th audio data and does not include the j-th audio data. As a result, play of the k-th audio data having low urgency played by the first audio player 3-1 is interrupted, and the j-th audio data having high urgency is played by the first audio player 3-1. The arbitration circuit 40 holds the k-th audio data input from the decoder 30 from an interrupted position where the play is interrupted, and outputs the held k-th audio data to the mixing circuit 50 from the interrupted position after the play of the j-th audio data is ended.

According to the audio mixing device 1 of the second embodiment described above, the same effects as those of the audio mixing device 1 according to the first embodiment are achieved. Further, according to the audio mixing device 1 of the second embodiment, in a case where the arbitration circuit 40 receives a command for starting the play of the j-th audio data having high urgency during the play of the k-th audio data having low urgency, when the first arbitration mode is set in the arbitration setting information 63, both the j-th audio data having high urgency and the k-th audio data having low urgency can be played without delay. Further, since a play volume of the k-th audio data is smaller than a play volume of the j-th audio data, it is possible to reduce a possibility that user's hearing of played audio of the j-th audio data having high urgency is hindered by played audio of the k-th audio data having low urgency.

According to the audio mixing device 1 of the second embodiment, in a case where the arbitration circuit 40 receives a command for starting the play of the j-th audio data having high urgency during the play of the k-th audio data having low urgency, when the second arbitration mode or the third arbitration mode is set in the arbitration setting information 63, the j-th audio data having high urgency can be played without delay. Further, since the k-th audio data is played from the beginning or from the interrupted position after the play of the j-th audio data is ended, it is possible to reduce a possibility that user's hearing of played audio of the k-th audio data having low urgency is hindered by played audio of the j-th audio data having high urgency.

1-3. Third Embodiment

Hereinafter, in the audio mixing device 1 according to a third embodiment, the same components as those in the first embodiment or the second embodiment will be denoted by the same reference numerals, description similar to that in the first embodiment or the second embodiment will be omitted or simplified, and content different from that in the first embodiment or the second embodiment will be mainly described.

Figure 9:
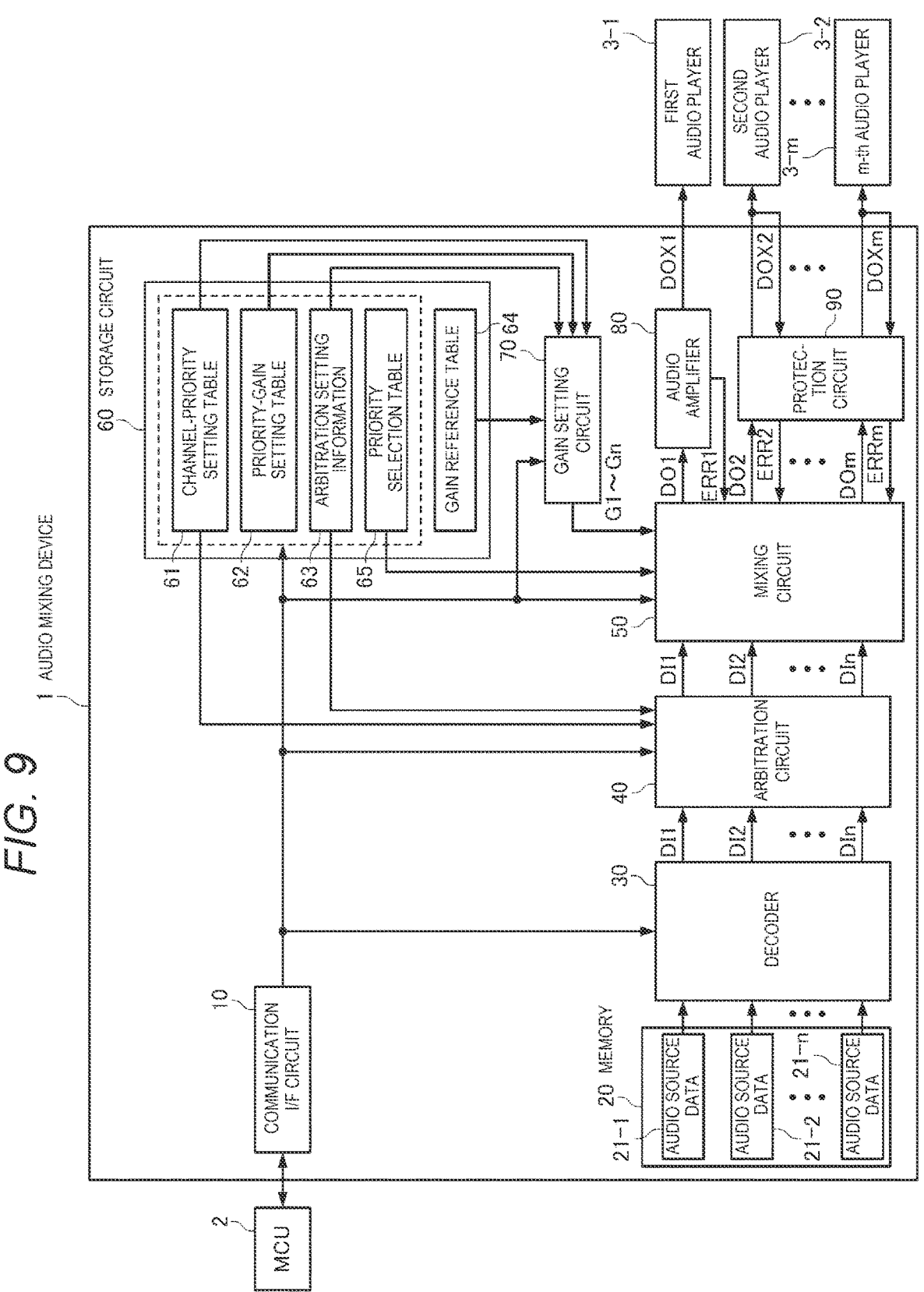
FIG. 9 is a diagram showing a configuration example of an audio mixing device according to a third embodiment.

FIG. 9 is a diagram showing a configuration example of the audio mixing device 1 according to the third embodiment. As shown in FIG. 9, the audio mixing device 1 according to the third embodiment includes the communication interface circuit 10, the memory 20, the decoder 30, the arbitration circuit 40, the mixing circuit 50, the storage circuit 60, the gain setting circuit 70, and the audio amplifier 80 in a similar manner to the first embodiment or the second embodiment, and the audio mixing device 1 according to the third embodiment further includes a protection circuit 90. The audio mixing device 1 according to the third embodiment may be a single-chip semiconductor integrated circuit device, or a multi-chip semiconductor integrated circuit device, or at least a part thereof may be implemented by an electronic component other than the semiconductor integrated circuit device.

Since functions and configurations of the memory 20, the decoder 30, the arbitration circuit 40, and the gain setting circuit 70 are the same as those in the first embodiment or the second embodiment, description thereof will be omitted.

The storage circuit 60 stores the channel-priority setting table 61, the priority-gain setting table 62, the arbitration setting information 63, and the gain reference table 64 in a similar manner to the first embodiment or the second embodiment, and the storage circuit 60 further stores a priority selection table 65. Since functions and configurations of the channel-priority setting table 61, the priority-gain setting table 62, the arbitration setting information 63, and the gain reference table 64 are the same as those in the first embodiment or the second embodiment, description thereof will be omitted. The function and configuration of the priority selection table 65 will be described later.

Similar to the first embodiment, the communication interface circuit 10 receives, from the micro-control unit 2, an audio play command or an audio stop command for the audio source data 21-*i* and a data write command for the channel-priority setting table 61, the priority-gain setting table 62, or the arbitration setting information 63, and generates a control signal corresponding to the received command. Further, in the third embodiment, when the communication interface circuit 10 receives a data write command for the priority selection table 65, the communication interface circuit 10 generates a control signal for writing data designated by an address designated by the command.

Similar to the first embodiment, the audio amplifier 80 converts the mixing signal DO1 output from the mixing circuit 50 into the audio signal DOX1 and outputs the audio signal DOX1 to the first audio player 3-1. Further, in the third embodiment, the audio amplifier 80 determines whether the audio signal DOX1 is normal or abnormal, and outputs an abnormality detection signal ERR1 to the mixing circuit 50 when it is determined that the audio signal DOX1 is abnormal.

Similar to the first embodiment, the mixing circuit 50 may output the mixing signal DO1 and further output the audio signals DO2 to DOm to the second to m-th audio players 3-2 to 3-*m*. Further, in the third embodiment, when the mixing circuit 50 receives the abnormality detection signal ERR1 output from the audio amplifier 80, the mixing circuit 50 outputs the mixing signal DO1 to any one of the second to m-th audio players 3-2 to 3-*m*. In particular, when the integer m is set to an integer of three or more and the abnormality detection signal ERR1 is input, the mixing circuit 50 selects one of the second to m-th audio players 3-2 to 3-*m* based on the priority selection table 65, and outputs the mixing signal DO1 to the selected one of the second to m-th audio players 3-2 to 3-*m*.

The priority selection table 65 stored in the storage circuit 60 is a table in which priorities are set to select an output channel from the second to m-th output channels as an output destination of the mixing signal DO1 when the mixing circuit 50 receives the abnormality detection signal ERR1. The priority selection table 65 is stored in a RAM or a register (not shown), and is rewritten by a command input from the outside of the audio mixing device 1.

For example, when the mixing circuit 50 receives the abnormality detection signal ERR1, the mixing circuit 50 may select the i-th audio player 3-*i* of the second to m-th audio players 3-2 to 3-*m* which is designated by a highest priority in the priority selection table 65, and output the mixing signal DO1 to the selected i-th audio player 3-*i*.

The protection circuit 90 outputs the audio signals DO2 to DOm as the respective audio signals DOX2 to DOXm to the second to m-th audio players 3-2 to 3-*m*, and determines whether each of the audio signals DOX2 to DOXm is normal or abnormal. The protection circuit 90 outputs abnormality detection signals ERR2 to ERRm to the mixing circuit 50 when it is determined that the audio signals DOX2 to DOXm are abnormal.

For example, when the mixing circuit 50 receives the abnormality detection signal ERR1, in a case where the abnormality detection signal ERRj of the abnormality detection signals ERR2 to ERRm is input, the mixing circuit 50 may output the mixing signal DO1 to a k-th audio player 3-*k* of the second to m-th audio players 3-2 to 3-*m* which is designated by a highest priority in the priority selection table 65 except the j-th audio player 3-*j*.

The audio mixing device 1 may not include the protection circuit 90.

Figure 10:
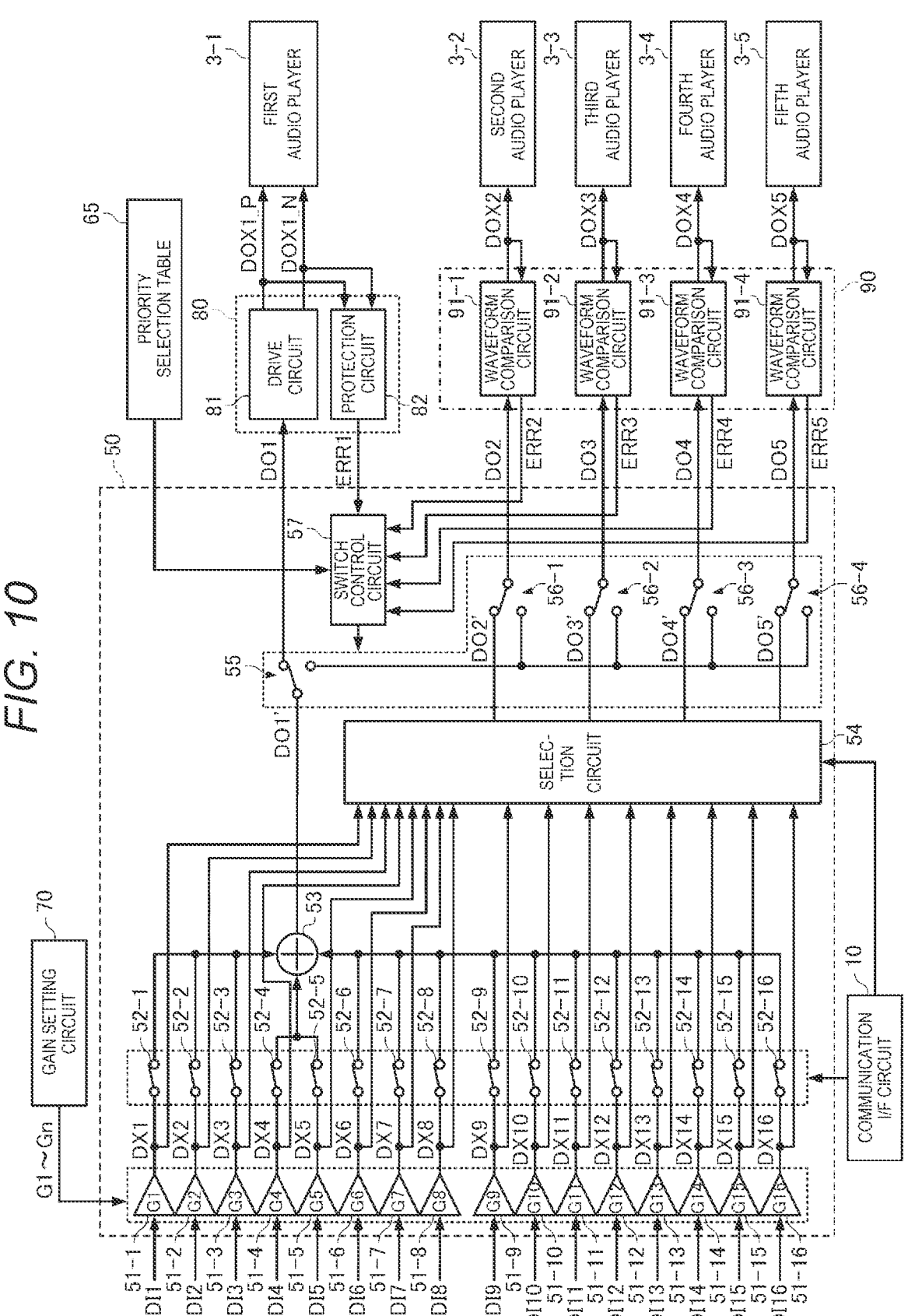
FIG. 10 is a diagram showing a specific configuration example of a mixing circuit, an audio amplifier, and a protection circuit according to the third embodiment.

FIG. 10 is a diagram showing a specific configuration example of the mixing circuit 50, the audio amplifier 80, and the protection circuit 90 according to the third embodiment. In the example of FIG. 10, the mixing circuit 50 includes 16 input channels and five output channels. That is, FIG. 10 shows an example in which the integer n in FIG. 9 is 16 and the integer m is 5.

In the example of FIG. 10, the audio amplifier 80 includes a drive circuit 81 and a protection circuit 82. The drive circuit 81 converts the mixing signal DO1 into the audio signal DOX1 and outputs the audio signal DOX1 to the first audio player 3-1. In the example of FIG. 10, the audio signal DOX1 is differential audio signals DOX1_P and DOX1_N. Accordingly, audio corresponding to the audio signals DOX1_P and DOX1_N is output from the first audio player 3-1.

The protection circuit 82 determines whether the audio signals DOX1_P and DOX1_N are normal or abnormal, and outputs the abnormality detection signal ERR1 to a switch control circuit 57 of the mixing circuit 50 when it is determined that the audio signals DOX1_P and DOX1_N are abnormal. For example, the protection circuit 82 may measure a current flowing through signal lines through which the audio signals DOX1_P and DOX1_N are output or through a signal line inside the drive circuit 81, detect an overcurrent when the measured value is higher than a predetermined value, and output the abnormality detection signal ERR1. The protection circuit 82 may output the abnormality detection signal ERR1 when logical levels of the audio signals DOX1_P and DOX1_N are high for a predetermined time or longer.

The protection circuit 90 includes four waveform comparison circuits 91-1 to 91-4.

The waveform comparison circuit 91-1 outputs the audio signal DO2 as the audio signal DOX2 to the second audio player 3-2. The waveform comparison circuit 91-1 compares a waveform of the audio signal DOX2 with a waveform of the audio signal DO2, determines whether the audio signal DOX2 is normal or abnormal based on a difference between the waveforms, and outputs the abnormality detection signal ERR2 to the switch control circuit 57 of the mixing circuit 50 when it is determined that the audio signal DOX2 is abnormal.

The waveform comparison circuit 91-2 outputs the audio signal DO3 as the audio signal DOX3 to the third audio player 3-3. The waveform comparison circuit 91-2 compares a waveform of the audio signal DOX3 with a waveform of the audio signal DO3, determines whether the audio signal DOX3 is normal or abnormal based on a difference between the waveforms, and outputs the abnormality detection signal ERR3 to the switch control circuit 57 of the mixing circuit 50 when it is determined that the audio signal DOX3 is abnormal.

The waveform comparison circuit 91-3 outputs the audio signal DO4 as the audio signal DOX4 to the fourth audio player 3-4. The waveform comparison circuit 91-3 compares a waveform of the audio signal DOX4 with a waveform of the audio signal DO4, determines whether the audio signal DOX4 is normal or abnormal based on a difference between the waveforms, and outputs the abnormality detection signal ERR4 to the switch control circuit 57 of the mixing circuit 50 when it is determined that the audio signal DOX4 is abnormal.

The waveform comparison circuit 91-4 outputs the audio signal DO5 as the audio signal DOX5 to the fifth audio player 3-5. The waveform comparison circuit 91-4 compares a waveform of the audio signal DOX5 with a waveform of the audio signal DO5, determines whether the audio signal DOX5 is normal or abnormal based on a difference between the waveforms, and outputs the abnormality detection signal ERR5 to the switch control circuit 57 of the mixing circuit 50 when it is determined that the audio signal DOX5 is abnormal.

Similar to FIG. 2, the mixing circuit 50 includes 16 multipliers 51-1 to 51-16, 16 switch circuits 52-1 to 52-16, the adder 53, and the selection circuit 54. Further, in the example of FIG. 10, the mixing circuit 50 includes a switch circuit 55, four switch circuits 56-1 to 56-4, and the switch control circuit 57.

Since the functions and configurations of the multipliers 51-1 to 51-16 and the switch circuits 52-1 to 52-16 are the same as those in FIG. 2, description thereof will be omitted.

The multiplication data DX1 to DX16 are input to the adder 53 via the switch circuits 52-1 to 52-16. The adder 53 outputs a mixing signal DO1' obtained by adding all pieces of input multiplication data among the multiplication data DX1 to DX16.

The selection circuit 54 selects any one of the multiplication data DX1 to DX16 and outputs the selected multiplication data as an audio signal DO2' from the second output channel to the switch circuit 56-1, or outputs a silent audio signal DO2' to the switch circuit 56-1 without selecting any one of the multiplication data DX1 to DX16.

The selection circuit 54 selects any one of the multiplication data DX1 to DX16 and outputs the selected multiplication data as an audio signal DO3' from the third output channel to the switch circuit 56-2, or outputs a silent audio signal DO3' to the switch circuit 56-2 without selecting any one of the multiplication data DX1 to DX16.

The selection circuit 54 selects any one of the multiplication data DX1 to DX16 and outputs the selected multiplication data as an audio signal DO4' from the fourth output channel to the switch circuit 56-3, or outputs a silent audio signal DO4' to the switch circuit 56-3 without selecting any one of the multiplication data DX1 to DX16.

The selection circuit 54 selects any one of the multiplication data DX1 to DX16 and outputs the selected multiplication data as an audio signal DO5' from the fifth output channel to the switch circuit 56-4, or outputs a silent audio signal DO5' to the switch circuit 56-4 without selecting any one of the multiplication data DX1 to DX16.

The selection circuit 54 selects whether to output the multiplication data DX1 to DX16 as the audio signals DO2' to DO5' according to control signals output from the communication interface circuit 10. That is, the micro-control unit 2 can set whether to output the multiplication data DX1 to DX16 as the respective audio signals DO2' to DO5' by outputting predetermined commands to the audio mixing device 1.

The switch circuit 55 switches between whether to output the mixing signal DO1' output from the adder 53 as the mixing signal DO1 from the first output channel to the drive circuit 81 of the audio amplifier 80 and whether to output the mixing signal DO1' to the switch circuits 56-1 to 56-4.

The switch circuit 56-1 selects one of the audio signal DO2' and the mixing signal DO1', and outputs the selected signal as the audio signal DO2 from the second output channel to the second audio player 3-2.

The switch circuit 56-2 selects one of the audio signal DO3' and the mixing signal DO1', and outputs the selected signal as the audio signal DO3 from the third output channel to the third audio player 3-3.

The switch circuit 56-3 selects one of the audio signal DO4' and the mixing signal DO1', and outputs the selected signal as the audio signal DO4 from the fourth output channel to the fourth audio player 3-4.

The switch circuit 56-4 selects one of the audio signal DO5' and the mixing signal DO1' and outputs the selected signal as the audio signal DO5 from the fifth output channel to the fifth audio player 3-5.

The switch control circuit 57 controls the switch circuit 55 and the switch circuits 56-1 to 56-4 based on the abnormality detection signals ERR1 to ERR5. Specifically, when the switch control circuit 57 does not receive the abnormality detection signal ERR1, that is, when the audio signal DOX1 output to the first audio player 3-1 is normal, the switch control circuit 57 controls the switch circuit 55 such that the mixing signal DO1' is output from the first output channel as the mixing signal DO1, and controls the switch circuits 56-1 to 56-4 such that the audio signals DO2' to DO5' are output from the second to fifth output channels as the respective audio signals DO2 to DO5.

When the switch control circuit 57 receives the abnormality detection signal ERR1, that is, when the audio signal DOX1 output to the first audio player 3-1 is abnormal, the switch control circuit 57 controls the switch circuit 55 such that the mixing signal DO1' is output to the switch circuits 56-1 to 56-4, and controls the switch circuits 56-1 to 56-4 such that the mixing signal DO1' is output from any one of the second to fifth output channels based on the abnormality detection signals ERR2 to ERR5 and the priority selection table 65. Specifically, when the switch control circuit 57 receives the abnormality detection signal ERR1, the switch control circuit 57 refers to the priority selection table 65, specifies the i-th output channel which has the highest priority among one or more output channels that do not receive corresponding abnormality detection signals, and controls the switch circuits 55, 56-1 to 56-4 such that the mixing signal DO1' is output from the i-th output channel.

FIG. 11 is a diagram showing an example of the priority selection table 65 when the mixing circuit 50 has a configuration as shown in FIG. 10. In FIG. 11, Ch2 to Ch5 are the second to fifth output channels of the mixing circuit 50, respectively. In the example of FIG. 11, in the priority selection table 65, the highest priority Pr1 is associated with the second output channel, the second highest priority Pr2 is associated with the third output channel, the third highest priority Pr3 is associated with the fourth output channel, and the lowest priority Pr4 is associated with the fifth input channel.

In the example of FIG. 11, in a case where the abnormality detection signal ERR1 is input when audio corresponding to the mixing signal DO1' is played by the first audio player 3-1, if the abnormality detection signal ERR2 is not input, that is, if the audio signal DOX1 is abnormal and the audio signal DOX2 is normal, the switch control circuit 57 switches the switch circuits 55 and 56-1 such that the mixing signal DO1' is output from the second output channel. Accordingly, audio played by the first audio player 3-1 is stopped, and audio corresponding to the mixing signal DO1' is played by the second audio player 3-2.

In a case where the abnormality detection signal ERR1 is input when the audio corresponding to the mixing signal DO1' is played by the first audio player 3-1, if the abnormality detection signal ERR2 is input and the abnormality detection signal ERR3 is not input, that is, when the audio signals DOX1 and DOX2 are abnormal and the audio signal DOX3 is normal, the switch control circuit 57 switches the switch circuits 55 and 56-2 such that the mixing signal DO1' is output from the third output channel. Accordingly, the audio played by the first audio player 3-1 is stopped, and the audio corresponding to the mixing signal DO1' is played by the third audio player 3-3.

In a case where the abnormality detection signal ERR1 is input when the audio corresponding to the mixing signal DO1' is played by the first audio player 3-1, if the abnormality detection signals ERR2 and ERR3 are input and the abnormality detection signal ERR4 is not input, that is, when the audio signals DOX1, DOX2, and DOX3 are abnormal and the audio signal DOX4 is normal, the switch control circuit 57 switches the switch circuits 55 and 56-3 such that the mixing signal DO1' is output from the fourth output channel. Accordingly, the audio played by the first audio player 3-1 is stopped, and the audio corresponding to the mixing signal DO1' is played by the fourth audio player 3-4.

In a case where the abnormality detection signal ERR1 is input when the audio corresponding to the mixing signal DO1' is played by the first audio player 3-1, if the abnormality detection signals ERR2, ERR3, and ERR4 are input and the abnormality detection signal ERR5 is not input, that is, when the audio signals DOX1, DOX2, DOX3, and DOX4 are abnormal and the audio signal DOX5 is normal, the switch control circuit 57 switches the switch circuits 55 and 56-4 such that the mixing signal DO1' is output from the fifth output channel. Accordingly, the audio played by the first audio player 3-1 is stopped, and the audio corresponding to the mixing signal DO1' is played by the fifth audio player 3-5.

According to the audio mixing device 1 of the third embodiment described above, the same effects as those of the audio mixing device 1 according to the first embodiment or the second embodiment are achieved. Further, in the audio mixing device 1 according to the third embodiment, when it is determined that the audio signal DOX1 is abnormal, the audio amplifier 80 outputs the abnormality detection signal ERR1 to the mixing circuit 50, and when the abnormality detection signal ERR1 is input, the mixing circuit 50 outputs the mixing signal DO1' to any one of the second to m-th audio players 3-2 to 3-$m$. Specifically, when the abnormality detection signal ERR1 is input, the mixing circuit 50 selects one of the second to m-th audio players 3-2 to 3-$m$ which has the highest priority and can play audio based on the priority selection table 65 and the abnormality detection signals ERR2 to ERRm, and outputs the mixing signal DO1'. Therefore, according to the audio mixing device 1 of the third embodiment, even when an abnormality occurs in the first audio player 3-1 or the audio amplifier 80, one of the second to m-th audio players 3-2 to 3-$m$ can play a plurality of pieces of audio data included in the first to p-th audio data having high urgency without delay.

1-4. Fourth Embodiment

Hereinafter, in the audio mixing device 1 according to a fourth embodiment, the same components as those in the first embodiment, the second embodiment, or the third embodiment will be denoted by the same reference numerals, description similar to that in the first embodiment, the second embodiment, or the third embodiment will be omitted or simplified, and content different from that in the first embodiment, the second embodiment, or the third embodiment will be mainly described.

Figure 12:
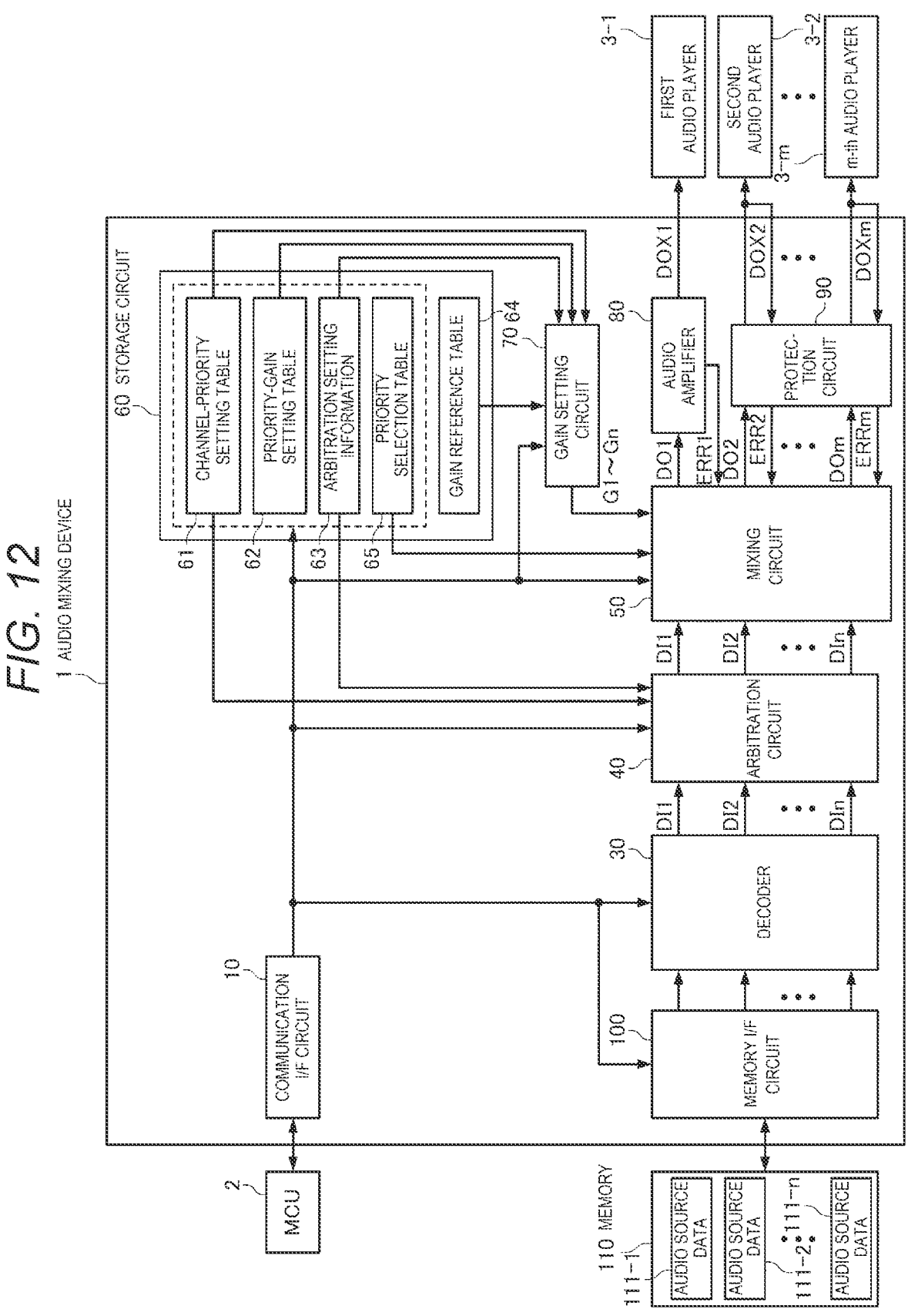
FIG. 12 is a diagram showing a configuration example of an audio mixing device according to a fourth embodiment.

FIG. 12 is a diagram showing a configuration example of the audio mixing device 1 according to the fourth embodiment. As shown in FIG. 12, the audio mixing device 1 according to the fourth embodiment includes a memory interface circuit 100 instead of the memory 20 as compared with the audio mixing device 1 according to the second embodiment shown in FIG. 9.

The memory interface circuit 100 receives audio source data 111-1 to 111-$n$ from a memory 110 outside the audio mixing device 1. The memory interface circuit 100 may be, for example, a QSPI interface circuit. QSPI is an abbreviation for Quad Serial Peripheral Interface.

In response to a control signal for instructing audio play for the audio source data 111-$i$ output from the communication interface circuit 10, the memory interface circuit 100 reads the audio source data 111-$i$ from the memory 110, and outputs the read audio source data 111-$i$ to the i-th input channel of the decoder 30.

The memory 110 stores n pieces of audio source data 111-1 to 111-$n$. That is, the n pieces of audio source data 111-1 to 111-$n$ are stored in the memory 110. The memory 110 may be, for example, a flash memory. The audio source data 111-1 to 111-$n$ may be, for example, PCM audio data, or may be ADPCM audio data. The audio data may be, for example, data of various kinds of sounds such as a sound imitating a voice when a person speaks, a mechanical warning sound, and a sound effect.

The decoder 30 decodes the audio source data 111-$i$ of the i-th input channel in response to a control signal for instructing audio play for the audio source data 111-$i$ output from the communication interface circuit 10, and demodulates the audio data DIi. When the audio data DIi is any one of the first to p-th audio data having high urgency, the arbitration circuit 40 immediately outputs the audio data DIi to the mixing circuit 50. When the audio data DIi is any one of the (p+1)-th to n-th audio data having low urgency, the arbitration circuit 40 waits until none of the first to p-th audio data having high urgency is being played, and then outputs the audio data DIi to the mixing circuit 50. As described above, the audio source data 111-1 to 111-$n$ stored in the memory 110 are data that serve as a base of the first to n-th audio data input to the mixing circuit 50.

Other configurations and functions of the audio mixing device 1 according to the fourth embodiment are the same as those of the audio mixing device 1 according to the third embodiment, and description thereof will be omitted.

The audio mixing device 1 according to the fourth embodiment may include the memory interface circuit 100 instead of the memory 20 as compared with the audio mixing device 1 shown in FIG. 1.

According to the audio mixing device 1 of the fourth embodiment described above, the same effects as those of the audio mixing device 1 according to the first embodiment, the second embodiment, or the third embodiment are achieved. Furthermore, the audio mixing device 1 according to the fourth embodiment includes the memory interface circuit 100 that receives the audio source data 111-1 to 111-$n$ from the external memory 110. Therefore, according to the audio mixing device 1 of the fourth embodiment, since the audio source data 111-1 to 111-$n$ can be received from the external memory 110 via the memory interface circuit 100, it is not necessary to incorporate a memory for storing the audio source data 111-1 to 111-$n$, and a circuit size can be reduced.

1-5. Fifth Embodiment

Hereinafter, in the audio mixing device 1 according to a fifth embodiment, the same components as those in the first embodiment, the second embodiment, or the third embodiment will be denoted by the same reference numerals, description similar to that in the first embodiment, the second embodiment, or the third embodiment will be omitted or simplified, and content different from that in the first embodiment, the second embodiment, or the third embodiment will be mainly described.

Figure 13:
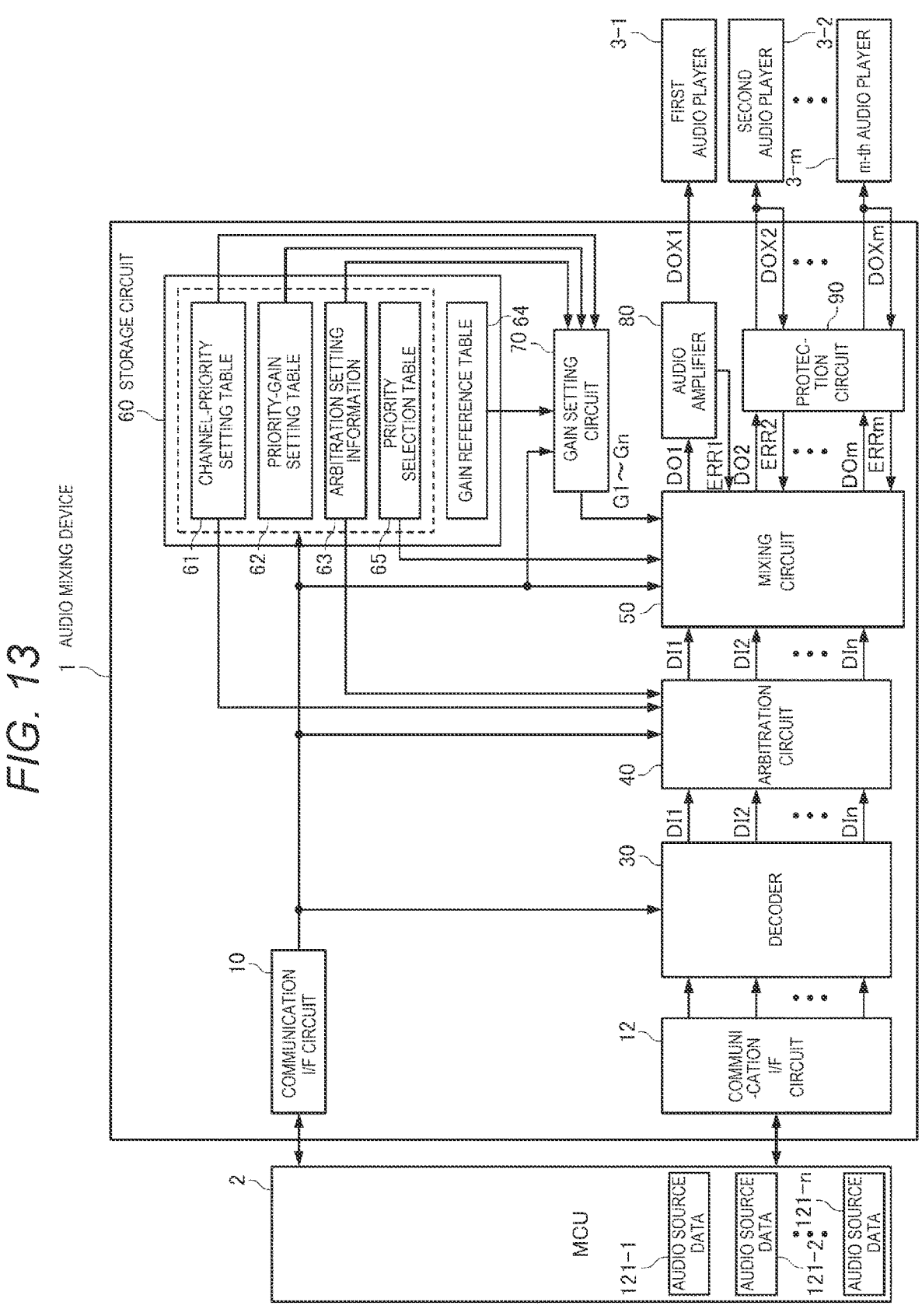
FIG. 13 is a diagram showing a configuration example of an audio mixing device according to a fifth embodiment.

FIG. 13 is a diagram illustrating a configuration example of the audio mixing device 1 according to the fifth embodiment. As shown in FIG. 13, the audio mixing device 1 according to the fifth embodiment includes a communication interface circuit 12 instead of the memory 20 as compared with the audio mixing device 1 according to the second embodiment shown in FIG. 9.

The communication interface circuit 12 receives audio source data 121-1 to 121-$n$ from the micro-control unit 2 outside the audio mixing device 1. The communication interface circuit 12 may be, for example, a TDM interface circuit or an I2S interface circuit. TDM is an abbreviation of time division multiplexing, and I2S is an abbreviation of inter-IC sound.

The micro-control unit 2 transmits an audio play command for the audio source data 121-$i$ to the communication interface circuit 10 and transmits the audio source data 121-$i$ to the communication interface circuit 12. The communication interface circuit 12 receives the audio source data 121-$i$ from the micro-control unit 2, and outputs the received audio source data 121-$i$ to the i-th input channel of the decoder 30.

The micro-control unit 2 may store at least a part of the audio source data 121-1 to 121-$n$ in a built-in memory (not shown). A memory (not shown) outside the micro-control unit 2 may store at least a part of the audio source data 121-1 to 121-$n$, and the micro-control unit 2 may read the audio source data 121-$i$ from the memory and transmit the audio source data 121-$i$ to the communication interface circuit 12.

The decoder 30 decodes the audio source data 111-$i$ of the i-th input channel in response to a control signal for instructing audio play for the audio source data 111-$i$ output from the communication interface circuit 10, and demodulates the audio data DIi. When the audio data DIi is any one of the first to p-th audio data having high urgency, the arbitration circuit 40 immediately outputs the audio data DIi to the mixing circuit 50. When the audio data DIi is any one of the (p+1)-th to n-th audio data having low urgency, the arbitration circuit 40 waits until none of the first to p-th audio data having high urgency is being played, and then outputs the audio data DIi to the mixing circuit 50. As described above, the audio source data 111-1 to 111-$n$ stored in the memory 110 are data that serve as a base of the first to n-th audio data input to the mixing circuit 50.

Other configurations and functions of the audio mixing device 1 according to the fifth embodiment are the same as those of the audio mixing device 1 according to the third embodiment, and description thereof will be omitted.

The audio mixing device 1 according to the fifth embodiment may include the communication interface circuit 12 instead of the memory 20 as compared with the audio mixing device 1 shown in FIG. 1. In the audio mixing device 1 according to the fifth embodiment, the communication interface circuit 10 may receive various commands from a plurality of micro-control units 2, and the communication interface circuit 12 may receive a plurality of pieces of audio source data from the plurality of micro-control units 2.

According to the audio mixing device 1 of the fifth embodiment described above, the same effects as those of the audio mixing device 1 according to the first embodiment, the second embodiment, or the third embodiment are achieved. Further, the audio mixing device 1 according to the fifth embodiment includes the communication interface circuit 12 that receives the audio source data 121-1 to 121-$n$ from the external micro-control unit 2. Therefore, according to the audio mixing device 1 of the fifth embodiment, since the audio source data 121-1 to 121-$n$ can be received from the external micro-control unit 2 via the communication interface circuit 12, it is not necessary to incorporate a memory for storing the audio source data 121-1 to 121-$n$, and a circuit size can be reduced.

1-6. Modifications

The present disclosure is not limited to the embodiment, and various modifications can be made without departing from a gist of the present disclosure.

For example, although the arbitration setting information 63 includes information of input channels having the p-th or (p+1)-th priority among the first to n-th input channels of the mixing circuit 50, that is, information of a priority serving as a boundary between the p pieces of audio data having high urgency and the n–p pieces of audio data having low urgency in the embodiments described above, the present disclosure is not limited thereto. The arbitration setting information 63 may be information for enabling the arbitration circuit 40 to determine whether it is necessary to arbitrate input of the audio data DIi to the i-th input channel. For example, the arbitration setting information 63 may include table information for defining a relationship between the first to n-th input channels and a necessity of arbitration. In this case, the arbitration circuit 40 can determine whether it is necessary to arbitrate the audio data DIi to be played based on the arbitration setting information 63 regardless of a priority of the i-th channel.

Although the channel-priority setting table 61 is defined, and priorities of the first to n-th input channels can be freely set in the embodiments described above, the priorities of the first to n-th input channels may be fixed. For example, the i-th input channel may be fixed to the i-th priority, the storage circuit 60 may store, instead of the channel-priority setting table 61, an audio-source-data-channel setting table that defines a correspondence relation between the n pieces of audio source data 21-1 to 21-$n$ and the first to n-th input channels of the mixing circuit 50, and the arbitration circuit 40 may refer to the audio-source-data-channel setting table to output the first to p-th audio data having high urgency to the first to p-th input channels and output the (p+1)-th to n-th audio data having low urgency to the (p+1)-th to n-th input channels. In this case, the arbitration setting information 63 may include information of the p-th input channel or the (p+1)-th input channel, and the arbitration circuit 40 may determine whether the i-th audio data to be played is audio data having high urgency or audio data having low urgency based on the arbitration setting information 63.

Figure 14:
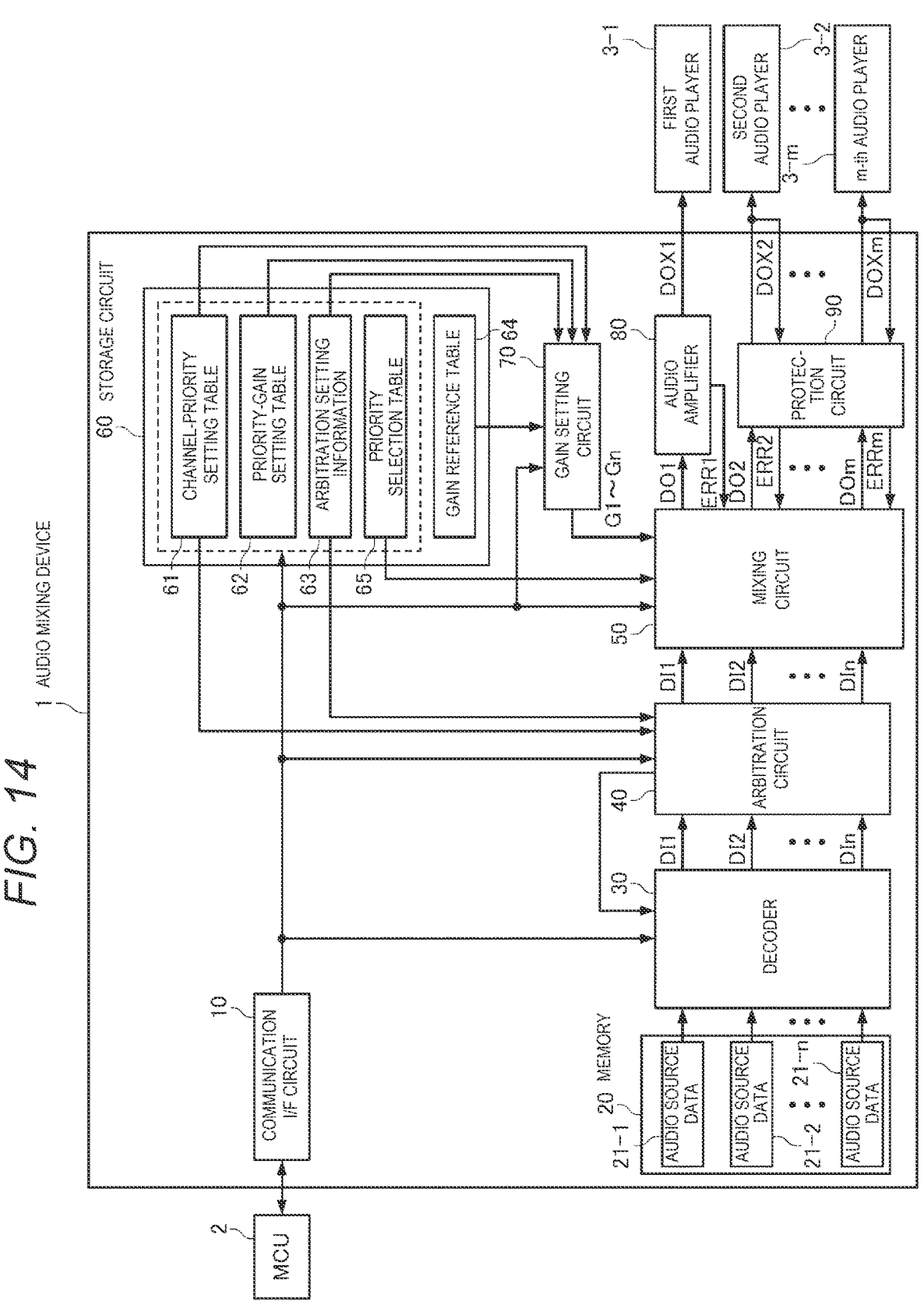
FIG. 14 is a diagram showing a configuration of an audio mixing device according to a modification.
Figure 15:
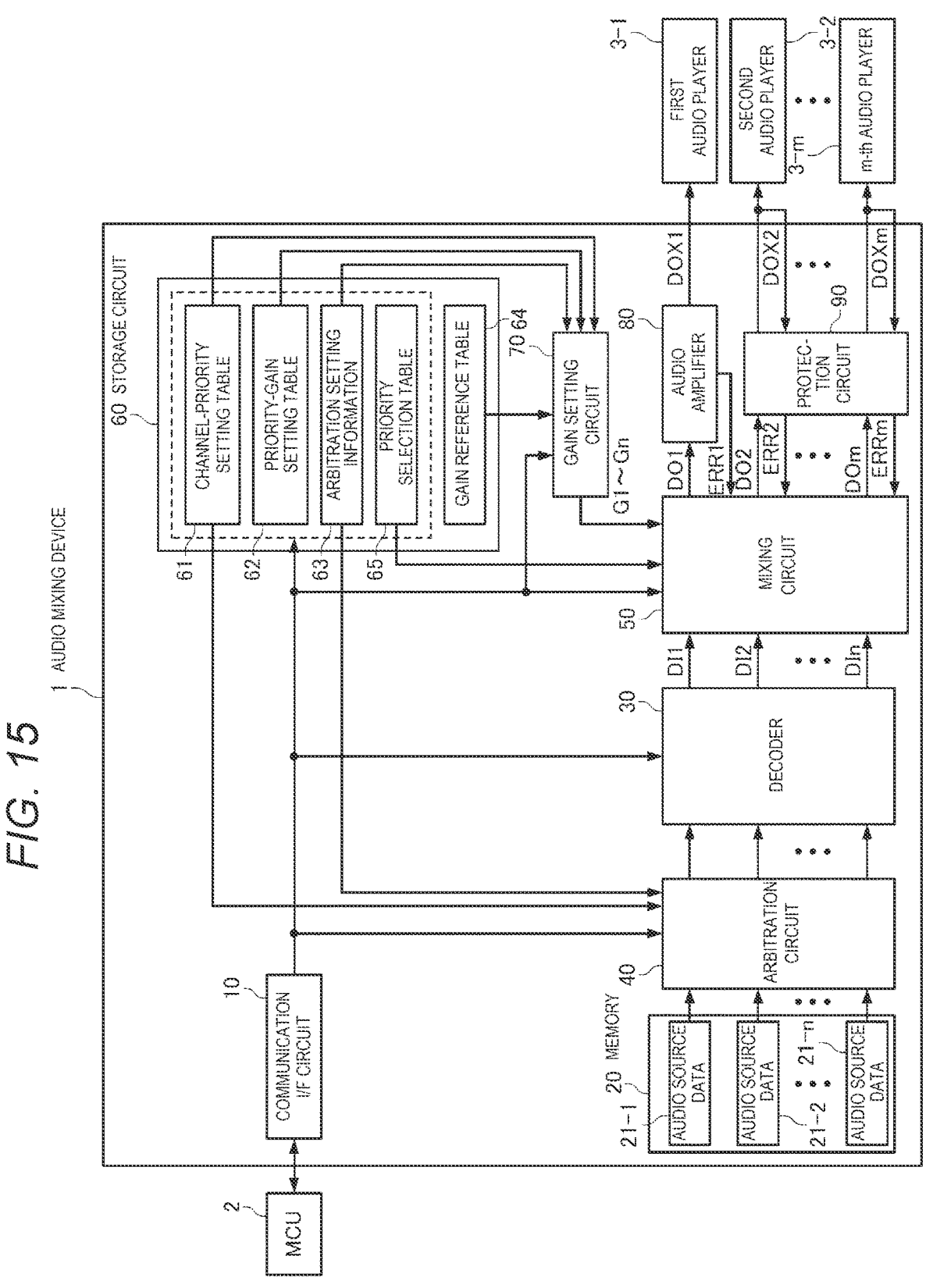
FIG. 15 is a diagram showing a configuration of an audio mixing device according to another modification.

Although the arbitration circuit 40 delays the input of audio data having low urgency to the mixing circuit 50 while holding the audio data having low urgency until none of the p pieces of audio data having high urgency is being played when the audio data having low urgency is input from the decoder 30 in the embodiments described above, an arbitration method of the arbitration circuit 40 is not limited thereto. For example, when the arbitration circuit 40 receives a play request for audio data having low urgency during play of at least one of the p pieces of audio data having high urgency, the arbitration circuit 40 may control the decoder 30 to delay processing of reading audio source data having low urgency from the memory 20 until none of the p pieces of audio data having high urgency is being played. FIG. 14 shows a configuration of the audio mixing device 1 according to this modification. In FIG. 14, components the same as those in FIG. 9 are denoted by the same reference numerals. Alternatively, the arbitration circuit 40 may be disposed between the memory 20 and the decoder 30, and may delay processing of reading audio source data having low urgency from the memory 20 until none of the p pieces of audio data having high urgency is being played. FIG. 15 shows a configuration of the audio mixing device 1 according to this modification. In FIG. 15, components the same as those in FIG. 9 are denoted by the same reference numerals. According to the audio mixing device 1 shown in FIG. 14 or FIG. 15, since the arbitration circuit 40 does not need to hold audio data having low urgency, a circuit size can be reduced.

Although the micro-control unit 2 can select the first arbitration mode, the second arbitration mode, or the third arbitration mode as an operation mode of the arbitration circuit 40 according to setting in the arbitration setting information 63 in the third embodiment, the operation mode of the arbitration circuit 40 may be fixed in advance at a design stage or at the time of shipment of the audio mixing device 1. That is, the arbitration circuit 40 may be constantly operated in the first arbitration mode, may be constantly operated in the second arbitration mode, or may be constantly operated in the third arbitration mode.

2. Electronic Device

Figure 16:
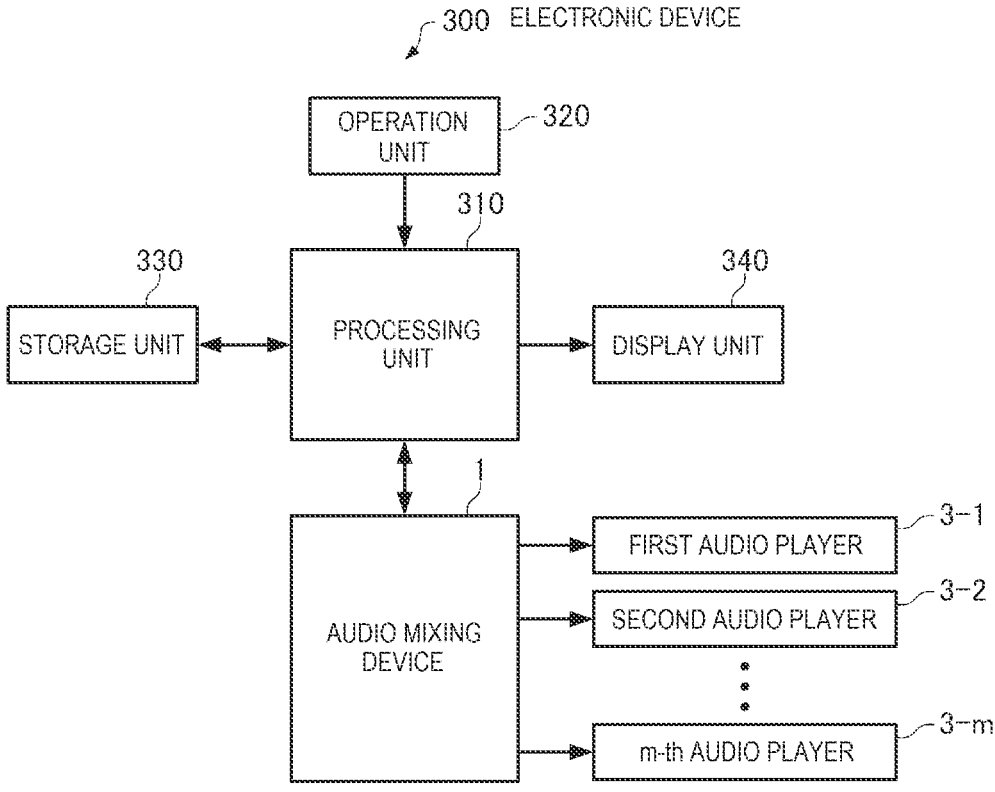
FIG. 16 is a functional block diagram showing an electronic device according to an embodiment.

FIG. 16 is a functional block diagram showing a configuration example of an electronic device according to an embodiment using the audio mixing device 1 according to an embodiment.

As shown in FIG. 16, an electronic device 300 according to the embodiment includes the audio mixing device 1, the first to m-th audio players 3-1 to 3-m, a processing unit 310, an operation unit 320, a storage unit 330, and a display unit 340. The electronic device 300 according to the embodiment may have a configuration in which some of the components in FIG. 16 are omitted or changed, or other components are added.

The processing unit 310 performs control processing and various kinds of data processing of units of the electronic device 300. For example, the processing unit 310 transmits various commands to the audio mixing device 1 to control an operation of the audio mixing device 1. The processing unit 310 performs various kinds of processing according to an operation signal from the operation unit 320, processing of transmitting a display signal for displaying various kinds of information on the display unit 340, and the like. For example, the processing unit 310 may be the micro-control unit 2 described above.

The operation unit 320 is an input device including an operation key, a button switch, and the like, and outputs an operation signal corresponding to an operation by a user to the processing unit 310.

The storage unit 330 stores programs, data, and the like for the processing unit 310 to perform various kinds of calculation processing and control processing. For example, the n pieces of audio source data may be stored in the storage unit 330, and the processing unit 310 may read any one piece of the n pieces of audio source data stored in the storage unit 330 and transmit the read audio source data to the audio mixing device 1. The storage unit 330 is implemented by, for example, a hard disk, a flexible disk, an MO, an MT, various memories, a CD-ROM, a DVD-ROM, or the like.

The display unit 340 is a display device implemented by an LCD or the like, and displays various kinds of information based on an input display signal. The LCD is an abbreviation of liquid crystal display. The display unit 340 may be provided with a touch panel that functions as the operation unit 320.

The audio mixing device 1 generates the mixing signal DO1 based on various commands transmitted from the processing unit 310, and outputs the audio signal DOX1 corresponding to the mixing signal DO1 to the first audio player 3-1. The audio mixing device 1 generates the audio signals DO2 to DOm or the audio signals DOX2 to DOXm based on various commands transmitted from the processing unit 310, and outputs the audio signals DO2 to DOm or the audio signals DOX2 to DOXm to the second to m-th audio players 3-2 to 3-m. Accordingly, audio is played by the first to m-th audio players 3-1 to 3-m.

Various electronic devices are conceivable as such an electronic device 300, and examples thereof include: various home electric products such as warning device, rice cooker, IH cooking heater, vacuum cleaner, and washing machine; electronic timepiece; personal computers of mobile type, laptop type, tablet type, and the like; mobile terminals such as smartphones and cellphones; digital camera; inkjet discharge devices such as inkjet printer; storage area network devices such as router and switch; local area network device; mobile terminal base station device; television; video camera; video recorder; car navigation device; real time clock device; pager; electronic notebook; electronic dictionary; calculator; electronic game device; game controller; word processor; work station; television telephone; security television monitor; electronic binoculars; POS terminal; medical device such as electronic thermometer, blood pressure meter, blood sugar meter, electrocardiogram measuring device, ultrasonic diagnostic device, and electronic endoscope; fish finder; various measuring instruments; measuring devices of vehicles, aircrafts, and ships; flight simulator; head-mounted display; motion trace; motion tracking; motion controller; and pedestrian autonomous navigation device.

Figure 17:
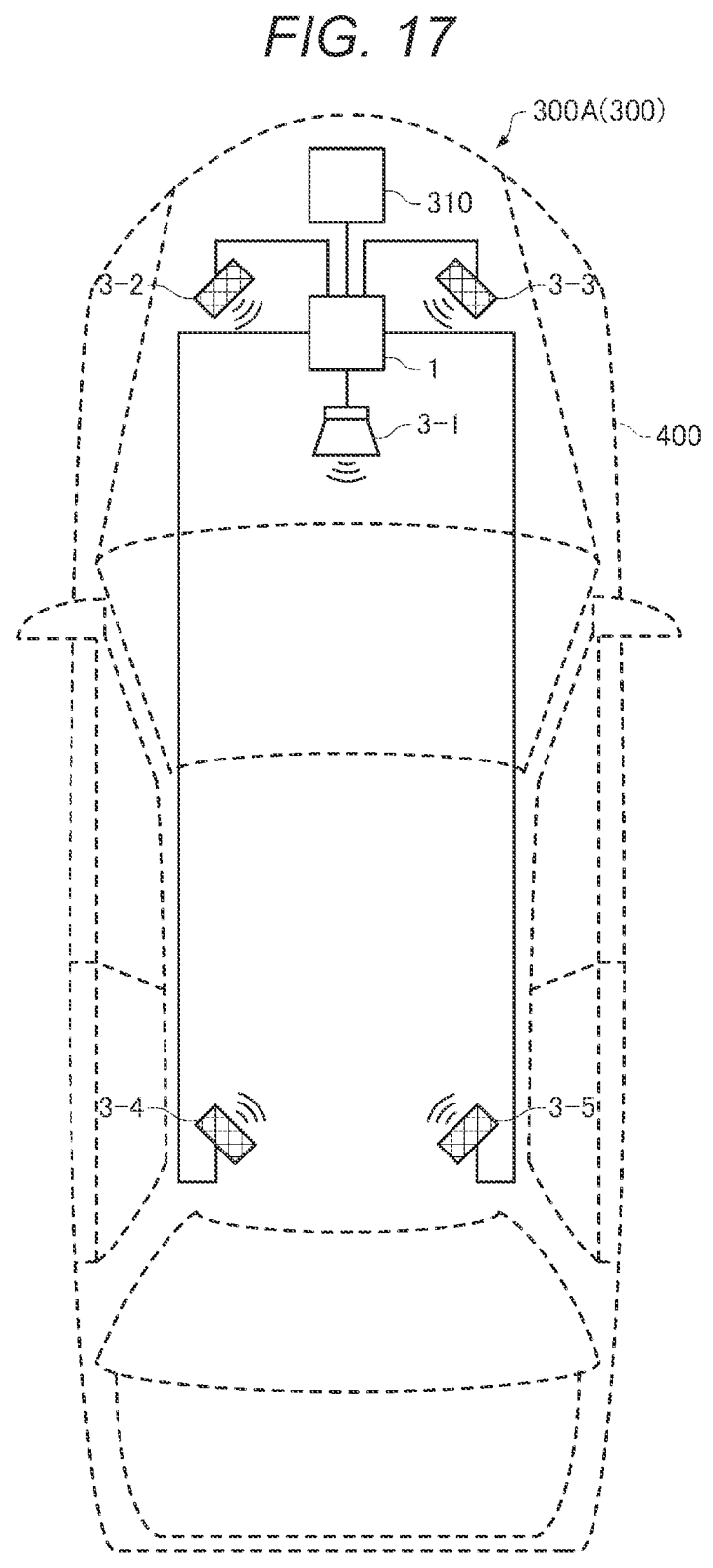

FIG. 17 is a diagram showing a configuration example of a warning device 300A which is an example of the electronic device 300. In FIG. 17, components the same as those in FIG. 16 are denoted by the same reference numerals. The warning device 300A shown in FIG. 17 is mounted on a vehicle 400. The first audio player 3-1 is a speaker, and each of the second to fifth audio players 3-2 to 3-5 is a buzzer.

The processing unit 310 transmits play commands and the like of various kinds of audio to the audio mixing device 1 based on signals from various sensors (not shown). The various kinds of audio include, for example, a sound imitating human voice or a warning sound for notifying abnormality of a brake, engine oil, power steering, a brake override system, or the like, traveling with a door not fully closed, unsteady traveling, traveling without releasing a parking brake, not wearing a seat belt, being close to a vehicle ahead, and the like, a sound effect for notifying turn signal, hazard, reversing, and the like, and sounds of various kinds of guidance.

The audio mixing device 1 generates the mixing signal DO1 based on a part of the n pieces of audio source data corresponding to various kinds of audio based on a command from the processing unit 310, and outputs the audio signal DOX1 corresponding to the mixing signal DO1 to the first audio player 3-1.

The audio mixing device 1 generates the audio signals DO2 to DO5 or the audio signals DOX2 to DOX5 based on the other part of the n pieces of audio source data, and outputs the audio signals DO2 to DO5 or the audio signals DOX2 to DOX5 to the second to fifth audio players 3-2 to 3-5. Accordingly, various kinds of audio are played by the first to fifth audio players 3-1 to 3-5.

Since the warning device 300A includes the audio mixing device 1 capable of outputting, without delay, a plurality of pieces of audio data having high urgency for which a play request was received, a plurality of pieces of audio for which play delay is not allowed due to high urgency can be simultaneously played without delay by the first audio player 3-1. Since the warning device 300A includes the audio mixing device 1 capable of delaying and outputting audio data having low urgency for which a play request is received, the warning device 300A can play audio having low urgency at a timing different from a timing when audio having high urgency is played by the first audio player 3-1, so that driver's hearing of the audio having high urgency is not hindered.

The embodiments and modifications described above are merely examples, and the present disclosure is not limited thereto. For example, the embodiments and the modifications can be combined as appropriate.

The present disclosure includes a configuration substantially the same as the configuration described in the embodiment, for example, a configuration having the same function, method, and result, or a configuration having the same purpose and effect. The present disclosure includes a configuration obtained by replacing a non-essential portion of the configuration described in the embodiment. The present disclosure includes a configuration having the same function and effect as the configuration described in the embodiment, or a configuration capable of achieving the same purpose. The present disclosure includes a configuration in which a known technique is added to the configuration described in the embodiment.

The following contents are derived from the embodiments and modifications described above.

An aspect of an audio mixing device includes: a mixing circuit configured to mix a plurality of pieces of audio data to be played included in first to p-th audio data among first to n-th audio data when the plurality of pieces of audio data are input in a same period, and output a mixing signal, n being an integer of three or more and p being an integer equal to or larger than two and less than n; and an arbitration circuit configured to arbitrate input of (p+1)-th to n-th audio data among the first to n-th audio data to the mixing circuit.

According to the audio mixing device, since the mixing circuit mixes the plurality of pieces of audio data to be played included in the first to p-th audio data, the plurality of pieces of audio data can be output without delay.

One aspect of the audio mixing device may further include a storage circuit configured to store information for specifying whether audio data to be played is included in the first to p-th audio data or included in the (p+1)-th to n-th audio data.

According to the audio mixing device, the arbitration circuit can determine whether the audio data to be played needs to be mixed based on the information stored in the storage circuit. It is possible to freely select whether each piece of audio data is to be mixed by setting the information by an external device.

In one aspect of the audio mixing device, in a case where the arbitration circuit receives a command for starting play of the k-th audio data included in the (p+1)-th to n-th audio data when the j-th audio data included in the first to p-th audio data is being played, the arbitration circuit may delay the input of the k-th audio data to the mixing circuit until the play of the j-th audio data is ended.

According to the audio mixing device, it is possible to delay the play of the k-th audio data until the play of the j-th audio data is ended, and thus it is possible to reduce a possibility that user's hearing of played audio of the k-th audio data is hindered by played audio of the j-th audio data.

One aspect of the audio mixing device may further include a gain setting circuit configured to set first to p-th gains for the respective first to p-th audio data based on a command input from the outside.

According to the audio mixing device, since the first to p-th gains are respectively set for the first to p-th audio data instead of a same gain, a user can easily distinguish a plurality of pieces of audio data to be simultaneously played.

In one aspect of the audio mixing device, the gain setting circuit may further set (p+1)-th to n-th gains for the respective (p+1)-th to n-th audio data, and in a case where the arbitration circuit receives the command for starting the play of the j-th audio data included in the first to p-th audio data during the play of the k-th audio data included in the (p+1)-th to n-th audio data, the arbitration circuit may start the input of the j-th audio data to the mixing circuit and continue the input of the k-th audio data to the mixing circuit, and the gain setting circuit may set the k-th gain of the (p+1)-th to n-th gains to a value smaller than the j-th gain of the first to p-th gains.

According to the audio mixing device, since the mixing circuit mixes the k-th audio data and the j-th audio data, both the k-th audio data and the j-th audio data can be output without delay. Further, according to the audio mixing device, since a play volume of the k-th audio data can be made smaller than a play volume of the j-th audio data, it is possible to reduce a possibility that user's hearing of played audio of the j-th audio data is hindered by played audio of the k-th audio data.

In one aspect of the audio mixing device, in a case where the arbitration circuit receives a command for starting the play of the j-th audio data included in the first to p-th audio data during the play of the k-th audio data included in the (p+1)-th to n-th audio data, the arbitration circuit may start the input of the j-th audio data to the mixing circuit, stop the input of the k-th audio data to the mixing circuit, and start the input of the k-th audio data to the mixing circuit from the beginning after the input of the j-th audio data to the mixing circuit is ended.

According to the audio mixing device, the j-th audio data can be output without delay. Further, according to the audio mixing device, since the k-th audio data is played from the beginning after the play of the j-th audio data is ended, it is possible to reduce a possibility that user's hearing of played audio of the k-th audio data is hindered by played audio of the j-th audio data.

In one aspect of the audio mixing device, in a case where the arbitration circuit receives a command for starting the play of the j-th audio data included in the first to p-th audio data during the play of the k-th audio data included in the (p+1)-th to n-th audio data, the arbitration circuit may start the input of the j-th audio data to the mixing circuit, interrupt the input of the k-th audio data to the mixing circuit, and restart the input of the k-th audio data to the mixing circuit from an interrupted position after the input of the j-th audio data to the mixing circuit is ended.

According to the audio mixing device, the j-th audio data can be output without delay. Further, according to the audio mixing device, since the k-th audio data is played from the interrupted position after the play of the j-th audio data is ended, it is possible to reduce a possibility that user's hearing of played audio of the k-th audio data is hindered by played audio of the j-th audio data.

In one aspect of the audio mixing device, during the play of the j-th audio data of the first to p-th audio data with a first value being set to the j-th gain of the first to p-th gains, the gain setting circuit may set the j-th gain to a second value different from the first value when the gain setting circuit receives a command for starting or stopping play of audio data having a higher priority than the j-th audio data of the first to p-th audio data.

According to the audio mixing device, when the priority of the j-th audio data during play increases or decreases, a play volume of the j-th audio data can be appropriately changed.

One aspect of the audio mixing device may further include a memory configured to store n pieces of audio source data that serve as a base of the first to n-th audio data.

According to the audio mixing device, since it is not necessary to acquire the n pieces of audio source data that serve as a base of the first to n-th audio data from the outside, it is possible to advance a timing when play of the first to n-th audio data is started.

One aspect of the audio mixing device may further include a memory interface circuit configured to receive the n pieces of audio source data that serve as a base of the first to n-th audio data from an external memory that stores the n pieces of audio source data.

According to the audio mixing device, since the n pieces of audio source data that serve as a base of the first to n-th audio data can be received from the external memory via the memory interface circuit, it is not necessary to incorporate a memory for storing the n pieces of audio source data, and a circuit size can be reduced.

One aspect of the audio mixing device may further include a communication interface circuit configured to receive, from an external micro-control unit, the n pieces of audio source data that serve as a base of the first to n-th audio data.

According to the audio mixing device, since the n pieces of audio source data that serve as a base of the first to n-th audio data can be received from the external micro-control unit via the communication interface circuit, it is not necessary to incorporate a memory for storing the n pieces of audio source data, and a circuit size can be reduced.

One aspect of the audio mixing device may further include an audio amplifier configured to convert the mixing signal into an audio signal and output the audio signal to a first audio player.

According to the audio mixing device, the first audio player can play a plurality of pieces of audio data included in the first to p-th audio data without delay.

In one aspect of the audio mixing device, the audio amplifier may be configured to determine whether the audio signal is normal or abnormal, and output an abnormality detection signal to the mixing circuit when it is determined that the audio signal is abnormal, and the mixing circuit may be configured to output the mixing signal to any one of second to m-th audio players when the abnormality detection signal is input, m being an integer of two or more.

According to the audio mixing device, even when an abnormality occurs in the first audio player or the audio amplifier, one of the second to m-th audio players can play a plurality of pieces of audio data included in the first to n-th audio data without delay.

In one aspect of the audio mixing device, the integer m may be an integer of three or more, and when the abnormality detection signal is input, the mixing circuit may select any one of the second to m-th audio players based on a priority selection table in which a priority for selecting each of the second to m-th audio players is designated, and output a mixing signal to the selected one of the second to m-th audio players.

According to the audio mixing device, even when an abnormality occurs in the first audio player or the audio amplifier, one of the second to m-th audio players having a high priority can play a plurality of pieces of audio data included in the first to p-th audio data without delay.

One aspect of an electronic device includes one aspect of the audio mixing device.

What is claimed is:

1. An audio mixing device comprising:
   a mixing circuit configured to mix a plurality of pieces of audio data to be played included in first to p-th audio data among first to n-th audio data when the plurality of pieces of audio data are input in a same period, and output a mixing signal, n being an integer of three or more and p being an integer equal to or larger than two and less than n; and
   an arbitration circuit configured to arbitrate input of (p+1)-th to n-th audio data among the first to n-th audio data to the mixing circuit, wherein
   when the arbitration circuit receives a command for starting play of the j-th audio data included in the first to p-th audio data during play of the k-th audio data included in the (p+1)-th to n-th audio data, the arbitration circuit starts the input of the j-th audio data to the mixing circuit, stops the input of the k-th audio data to the mixing circuit, and starts the input of the k-th audio data to the mixing circuit from the beginning after the input of the j-th audio data to the mixing circuit is ended.

2. The audio mixing device according to claim 1, further comprising:
   a storage circuit configured to store information for specifying whether audio data to be played is included in the first to p-th audio data or included in the (p+1)-th to n-th audio data.

3. The audio mixing device according to claim 1, wherein
   in a case where the arbitration circuit receives a command for starting play of k-th audio data included in the (p+1)-th to n-th audio data when j-th audio data included in the first to p-th audio data is being played, the arbitration circuit delays input of the k-th audio data to the mixing circuit until play of the j-th audio data is ended.

4. The audio mixing device according to claim 1, further comprising:
   a gain setting circuit configured to set first to p-th gains for the respective first to p-th audio data based on a command input from the outside.

5. The audio mixing device according to claim 4, wherein during the play of the j-th audio data of the first to p-th audio data with a first value being set to the j-th gain of the first to p-th gains, the gain setting circuit sets the j-th gain to a second value different from the first value when the gain setting circuit receives a command for starting or stopping play of audio data having a higher priority than the j-th audio data among the first to p-th audio data.

6. The audio mixing device according to claim 1, further comprising:

a memory configured to store n pieces of audio source data that serve as a base of the first to n-th audio data.

7. The audio mixing device according to claim 1, further comprising:

a memory interface circuit configured to receive the n pieces of audio source data that serve as a base of the first to n-th audio data from an external memory that stores the n pieces of audio source data.

8. The audio mixing device according to claim 1, further comprising:

a communication interface circuit configured to receive, from an external micro-control unit, the n pieces of audio source data that serve as a base of the first to n-th audio data.

9. The audio mixing device according to claim 1, further comprising:

an audio amplifier configured to convert the mixing signal into an audio signal and output the audio signal to a first audio player.

10. The audio mixing device according to claim 9, wherein the audio amplifier is configured to determine whether the audio signal is normal or abnormal, and output an abnormality detection signal to the mixing circuit when it is determined that the audio signal is abnormal, and the mixing circuit is configured to output the mixing signal to any one of second to m-th audio players when the abnormality detection signal is input, m being an integer of two or more.

11. The audio mixing device according to claim 10, wherein the integer m is an integer of three or more, and when the abnormality detection signal is input, the mixing circuit selects any one of the second to m-th audio players based on a priority selection table in which a priority for selecting each of the second to m-th audio players is designated, and outputs the mixing signal to the selected one of the second to m-th audio players.

12. An electronic device comprising:

the audio mixing device according to claim 1.

13. An audio mixing device comprising:

a mixing circuit configured to mix a plurality of pieces of audio data to be played included in first to p-th audio data among first to n-th audio data when the plurality of pieces of audio data are input in a same period, and output a mixing signal, n being an integer of three or more and p being an integer equal to or larger than two and less than n; and an arbitration circuit configured to arbitrate input of (p+1)-th to n-th audio data among the first to n-th audio data to the mixing circuit, wherein when the arbitration circuit receives a command for starting play of the j-th audio data included in the first to p-th audio data during play of the k-th audio data included in the (p+1)-th to n-th audio data, the arbitration circuit starts the input of the j-th audio data to the mixing circuit, interrupts the input of the k-th audio data to the mixing circuit, and restarts the input of the k-th audio data to the mixing circuit from an interrupted position after the input of the j-th audio data to the mixing circuit is ended.

14. The audio mixing device according to claim 13, further comprising:

a storage circuit configured to store information for specifying whether audio data to be played is included in the first to p-th audio data or included in the (p+1)-th to n-th audio data.

15. The audio mixing device according to claim 13, wherein in a case where the arbitration circuit receives a command for starting play of k-th audio data included in the (p+1)-th to n-th audio data when j-th audio data included in the first to p-th audio data is being played, the arbitration circuit delays input of the k-th audio data to the mixing circuit until play of the j-th audio data is ended.

16. The audio mixing device according to claim 13, further comprising:

a gain setting circuit configured to set first to p-th gains for the respective first to p-th audio data based on a command input from the outside.

17. The audio mixing device according to claim 16, wherein during the play of the j-th audio data of the first to p-th audio data with a first value being set to the j-th gain of the first to p-th gains, the gain setting circuit sets the j-th gain to a second value different from the first value when the gain setting circuit receives a command for starting or stopping play of audio data having a higher priority than the j-th audio data among the first to p-th audio data.

18. The audio mixing device according to claim 13, further comprising:

a memory configured to store n pieces of audio source data that serve as a base of the first to n-th audio data.

19. The audio mixing device according to claim 13, further comprising:

an audio amplifier configured to convert the mixing signal into an audio signal and output the audio signal to a first audio player.

20. An audio mixing device comprising:

a mixing circuit configured to mix a plurality of pieces of audio data to be played included in first to p-th audio data among first to n-th audio data when the plurality of pieces of audio data are input in a same period, and output a mixing signal, n being an integer of three or more and p being an integer equal to or larger than two and less than n;

an arbitration circuit configured to arbitrate input of (p+1)-th to n-th audio data among the first to n-th audio data to the mixing circuit; and a gain setting circuit configured to set first to p-th gains for the respective first to p-th audio data based on a command input from the outside, wherein the gain setting circuit further sets (p+1)-th to n-th gains for the respective (p+1)-th to n-th audio data, and when the command for starting the play of the j-th audio data included in the first to p-th audio data during the play of k-th audio data included in the (p+1)-th to n-th audio data is input, the arbitration circuit starts to input of the j-th audio data to the mixing circuit and continues input of the k-th audio data to the mixing circuit, and the gain setting circuit sets the k-th gain of the (p+1)-th to n-th gains to a value smaller than the j-th gain of the first to p-th gains.

\* \* \* \* \*